US010757852B2

(12) United States Patent
Thielicke et al.

(10) Patent No.: US 10,757,852 B2
(45) Date of Patent: Sep. 1, 2020

(54) HITCH ASSEMBLY FOR TOWING A SECOND AGRICULTURAL IMPLEMENT BEHIND A FIRST AGRICULTURAL IMPLEMENT

(71) Applicant: Degelman Industries Ltd., Regina, Saskatchewan (CA)

(72) Inventors: René Thielicke, Halle (DE); Jeff Pridmore, Earl Grey (CA)

(73) Assignee: Degelman Industries LP, Saskatoon (CA)

( * ) Notice: Subject to any disclaimer, the term of this patent is extended or adjusted under 35 U.S.C. 154(b) by 172 days.

(21) Appl. No.: 16/010,802

(22) Filed: Jun. 18, 2018

(65) Prior Publication Data
US 2019/0380253 A1   Dec. 19, 2019

(51) Int. Cl.
*A01B 59/00* (2006.01)
*A01B 49/02* (2006.01)
*A01B 59/042* (2006.01)
*A01B 73/06* (2006.01)
*A01B 73/04* (2006.01)

(52) U.S. Cl.
CPC .......... *A01B 59/002* (2013.01); *A01B 49/027* (2013.01); *A01B 59/042* (2013.01); *A01B 73/048* (2013.01); *A01B 73/065* (2013.01)

(58) Field of Classification Search
CPC ... A01B 59/042; A01B 59/002; A01B 49/027; A01B 73/048; A01B 73/065
See application file for complete search history.

(56) References Cited

U.S. PATENT DOCUMENTS

| 2,458,330 | A | * | 1/1949 | Bauer | A01B 59/042 |
| | | | | | 280/467 |
| D244,192 | S | | 5/1977 | Murray | |
| 4,433,735 | A | | 2/1984 | Clark | |
| 4,478,032 | A | * | 10/1984 | Inskeep | A01D 67/005 |
| | | | | | 172/679 |
| 5,025,616 | A | * | 6/1991 | Moss | A01B 51/00 |
| | | | | | 111/57 |
| 5,544,475 | A | | 8/1996 | Skibo | |
| 5,720,352 | A | | 2/1998 | Tharaldson | |
| 6,178,728 | B1 | | 1/2001 | Rowse et al. | |
| 6,711,884 | B1 | | 3/2004 | McLeod et al. | |
| 2008/0092506 | A1 | | 4/2008 | Philips et al. | |

FOREIGN PATENT DOCUMENTS

| CA | 2593882 A1 | 3/2008 |
| CA | 2289148 C | 8/2008 |
| JP | 2003339205 A | 12/2003 |

* cited by examiner

*Primary Examiner* — Jessica H Lutz
(74) *Attorney, Agent, or Firm* — Craig J. Lervick; Larkin Hoffman Daly & Lindgren Ltd.

(57) ABSTRACT

A rear tow hitch assembly connectable to a work tool assembly on a first agricultural implement to tow a second agricultural implement behind the first agricultural implement is provided. The first agricultural implement can be transformable between an operating position and a transport position by pivoting the work tool assembly upwards around a first axis. The rear tow hitch assembly can be shaped to clear the work tool assembly when the first agricultural implement is transformed between the operating position and the transport position while a rear tow hitch assembly remains connected to the second agricultural implement during the transformation.

35 Claims, 19 Drawing Sheets

HITCH ASSEMBLY FOR TOWING A SECOND AGRICULTURAL IMPLEMENT BEHIND A FIRST AGRICULTURAL IMPLEMENT

The present invention relates to an hitch assembly for towing a second agricultural implement behind a first agricultural implement being towed behind a tow vehicle and more particularly a hitch assembly that allows the first agricultural implement to be transformed between an operating position and a transport position while the hitch assembly remains connected to the second agricultural implement.

BACKGROUND

In the agricultural industry, it is sometimes desirable to tow two agricultural implements behind a tow vehicle with a first agricultural implement towed directly behind the tow vehicle and a second agricultural implement towed behind and connected to the first agricultural implement. For example, it may be desirable to tow a cultivator through a field followed by an air cart or some other finishing implement towed behind the cultivator. If the agricultural implement being towed behind the cultivator is an air cart, it may be used to direct seed or fertilizer back to the cultivator so that the seed or fertilizer could be placed in the soil using the cultivator. In the case of other finishing tools, these can be used to further prepare the soil in the field.

For the cultivation of soil, for example, various styles of cultivators and harrows are employed. In cooler climates the most common types are the disc cultivator (sometimes called a disc harrow), the chain harrow, the tine harrow or spike harrow and the spring tine harrow. Chain harrows are often used for lighter work such as leveling the tilth or covering seed, while disc cultivators are typically used for heavy work, such as following plowing to break up the sod. Tine harrows are used to refine seed-bed condition before planting, to remove small weeds in growing crops and to loosen the inter-row soils to allow for water to soak into the subsoil. All three types can be used in one pass to prepare the soil for seeding. It is also common to use any combination of two harrows for a variety of tilling processes. Where harrowing provides a very fine tilth, or the soil is very light so that it might easily be wind-blown, a roller is often added as the last of the set. The disc cultivator is an implement used primarily to break up and smooth soil in preparation for planting and for the task of preparing soil for planting including tilling and leveling of fallow soil.

Cultivators and other agricultural implements have also increased in size over the years as tractors have increased in power resulting in some cultivators being quite large. Because of this many agricultural implements have sections that can fold up to reduce the size of the agricultural implement for transport, such as between fields or along roadways. These agricultural implements can be transformed between an operating position for use in a field and then "folded up" to make transport along roadways easier and safer.

However, this "folding" that some agricultural implements are capable of in order to ease transport presents challenges for connecting a second implement behind the first agricultural implement. The "folding" of the first agricultural implement can interfere with the connection to an implement being towed behind the cultivator.

SUMMARY OF THE INVENTION

In a first aspect, a first agricultural implement is provided. The first agricultural implement can have a front end and a rear end, a tow assembly attached to the front end of the frame so the first agricultural implement can be towed by a tow vehicle in a direction of travel, a work tool assembly having a front end and a rear end, the work tool assembly pivotally attached at the front end of the work tool assembly to the rear end of the frame so that the work tool assembly is pivotal around a first axis substantially perpendicular to the direction of the travel of the first agricultural implement, a pair of ground wheels and a rear tow hitch assembly connected to the work tool assembly. The rear tow hitch assembly can have a main support frame having a first end and a second end, the first end of the main support frame pivotally connected to the work tool assembly at a pivot point proximate the rear end of the work tool assembly, an arched frame having a first end and a second end, the first end of the arched frame connected to the second end of the main support frame, the arched frame shaped to clear the work tool assembly and a rear hitch provided at a second end of the arched frame, the rear hitch connectable to a second agricultural implement. The first agricultural implement can be transformable between an operating position and a transport position by pivoting the work tool assembly upwards around the first axis. The rear tow hitch assembly can be shaped to clear the work tool assembly when the first agricultural implement is transformed between the operating position and the transport position while the rear tow hitch assembly remains connected to the second agricultural implement.

In a second aspect, a rear tow hitch assembly connectable to work tool assembly on a first agricultural implement to tow a second agricultural implement behind the first agricultural implement is provided. The rear tow hitch assembly can include a main support frame having a first end and a second end, the first end of the main support frame pivotally connected to the work tool assembly at a pivot point proximate the rear end of the work tool assembly, an arched frame having a first end and a second end, the first end of the arched frame connected to the second end of the main support frame, the arched frame shaped to clear the work tool assembly and a rear hitch provided at a second end of the arched frame and connectable to the second agricultural implement. The rear tow hitch assembly is shaped to not contact the work tool assembly when the first agricultural element is transformed between an operating position and a transport position.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
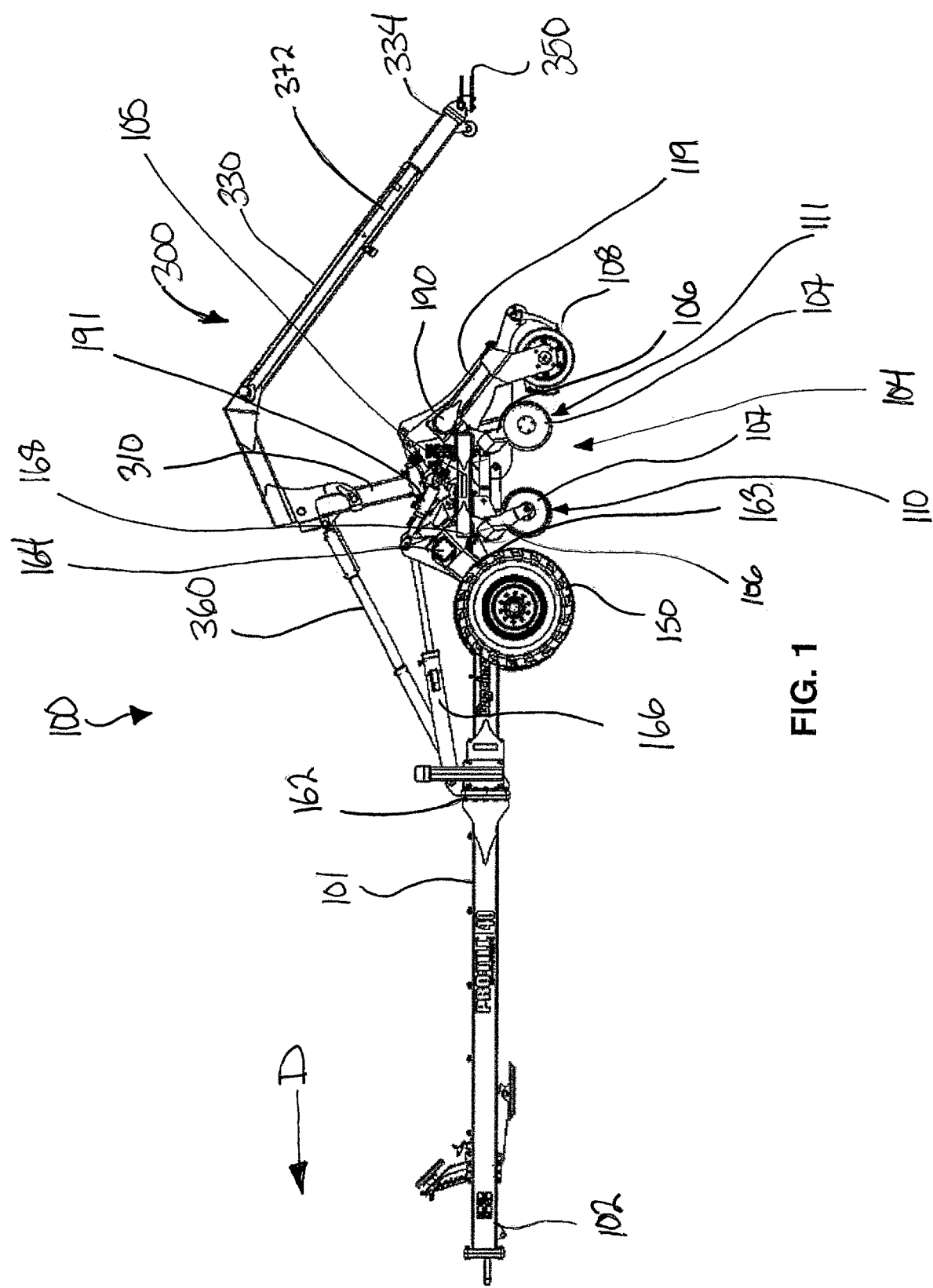
FIG. 1 is a side view of a first implement with a rear tow hitch assembly for towing a second implement behind the first implement.
Figure 2:
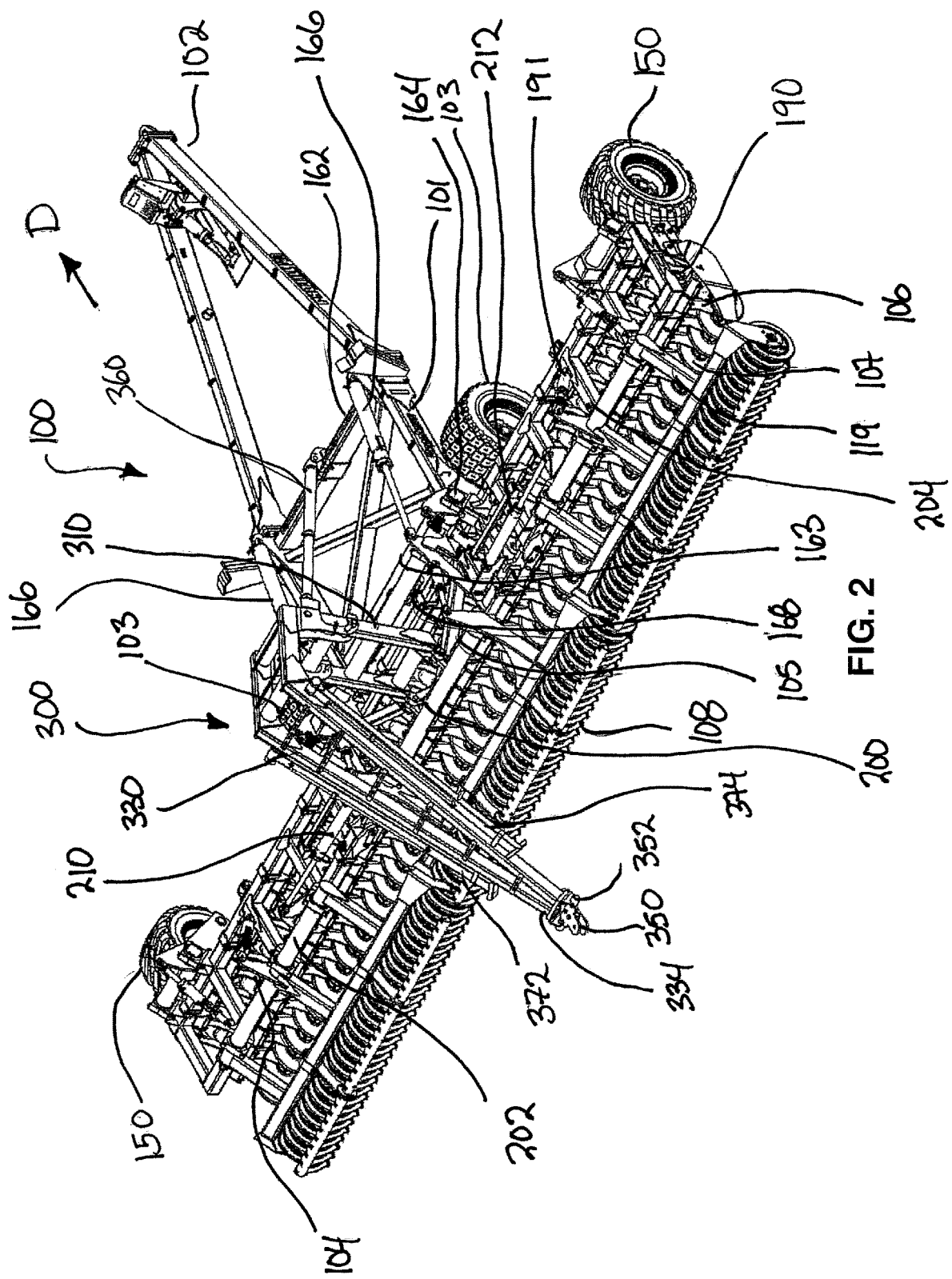
FIG. 2 is perspective view of first implement and rear tow hitch assembly of FIG. 1.
Figure 3:
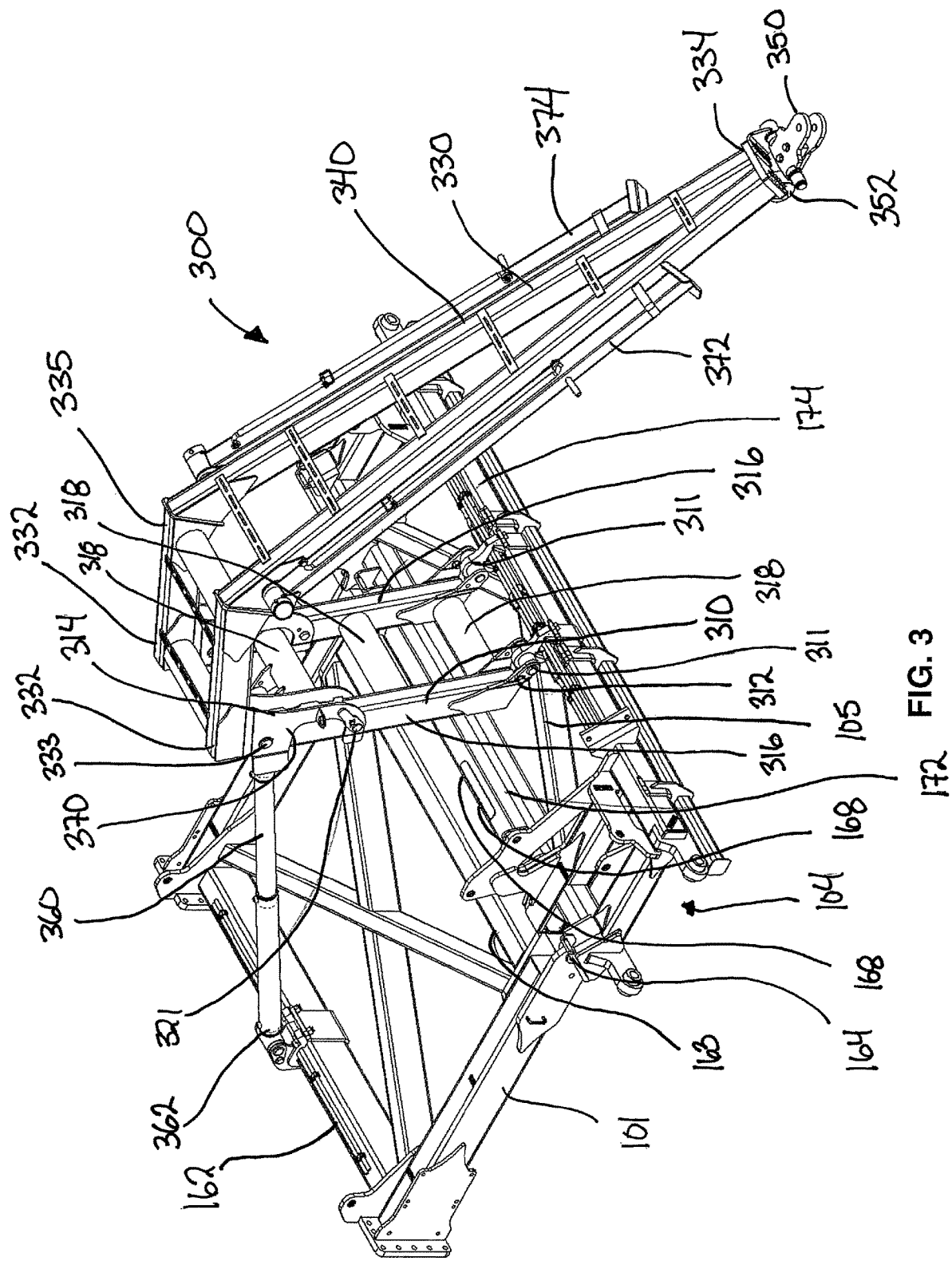
FIG. 3 is a perspective view of the rear tow hitch assembly and a portion of the first implement.

FIGS. 1 and 2 illustrates a side view and a rear perspective view, respectively, of a first implement 100 to be towed behind a tow vehicle (not shown). The first implement 100 shown is a cultivator for cultivating a field and preparing the field for the planting of a crops with a rear tow hitch assembly 300 provided on the first implement 100 to allow a second implement, such as an air cart for supplying seed and/or fertilizer, to be towed behind the first implement 100.

The first implement 100 can include a frame 101 adapted to be towed across a field in a direction of travel D using a tow assembly 102, ground wheels 103, support wheels 150, and a work tool assembly 104 attached to the frame 101. The first implement 100 can be transformed between an operating position for use in cultivating a field, with the work tool assembly 104 pivoted into a substantially horizontal position, and a transport position, with the work tool assembly 104 pivoted vertically for transport from one field to another, along a roadway, etc. The rear tow hitch assembly 300 can be shaped in such a way that the rear tow hitch assembly 300 can be connected to a second implement to be towed behind the first implement 100, yet have clearance so that the second implement can remain connected to the rear tow hitch assembly 300 and therefore the first implement 100 when the first implement 100 is either in the operating position or the transporting position. The shape of the rear tow hitch assembly 300 can also allow the second implement to remain connected to the rear tow hitch assembly 300 and the first implement 100 when the first implement 100 is being transformed between the two positions.

Referring to FIGS. 3-6, the rear tow hitch assembly 300 can be provided attached to the back of the work tool assembly 104 and used to tow a second implement behind the first implement 100. When a rear hitch 350 on the rear tow hitch assembly 300 is connected to a second implement, converting the first implement 100 from an operating position to a transport position will have the rear tow hitch assembly 300 maintain its connection to the second implement as the work tool assembly 104 is placed in an upright position for transport. The shape of the rear tow hitch assembly 300 and its point of connection to the work tool assembly 104 will allow rear tow hitch assembly 300 to clear the work tool assembly 104 and any finishing tool 108 connected behind work tool assembly 104 while maintaining the connection of the rear tow hitch assembly 300 to the second implement as the work tool assembly 104 pivots upwards to move the first implement 100 into the transport position.

In one aspect, parts of the rear tow hitch assembly 300 can be relatively easily removable for times when an operator wants to use the first implement 100 without towing a second implement and would prefer not to have the whole rear tow hitch assembly 300 connected to the first implement 100.

The rear tow hitch assembly 300 can include: a main support frame 310, an arched frame 330; a rear hitch 350; a hitch wheel 352; a positioning actuator 360; and a pair of support legs 372, 374.

The main support frame 310 can have a first end 312 and a second end 314. The first end 312 of the main support frame 310 can be pivotally attached at a first end 312 to a rear of the work tool assembly 104 at pivot points 311 so that the main support frame 310 extends vertically from the work tool assembly 104 when the work tool assembly 104 is in the operating position. The main support frame 310 can have a pair of side members 316 with laterally extending lateral members 318 so that the main support frame 310 takes the form of a ladder frame.

Retaining sections 319 (which can be seen in FIG. 14) can be provided at the second end 314 of the main support frame 310 for connecting the main support frame 310 to the arched frame 330. In one aspect, the retaining sections 319 can have a c-shaped profile with the opening formed by the c-shaped profile facing a front end of the first implement 100.

The arched frame 330 can have a first end 332 that is connectable to the second end 314 of the main support frame 310. The first end 332 of the arched frame 330 can have pins 333 fixed to the first end 332 of the arched frame 330. These pins 333 can mate with the retaining sections 319 on the second end 314 of the main support frame 310. If the retaining sections 319 have c-shaped profiles facing forwards, mating the pins 333 in the retaining sections 319 from the front will prevent the arched frame 330 from moving backwards relative to the main support frame 310.

Figure 4:
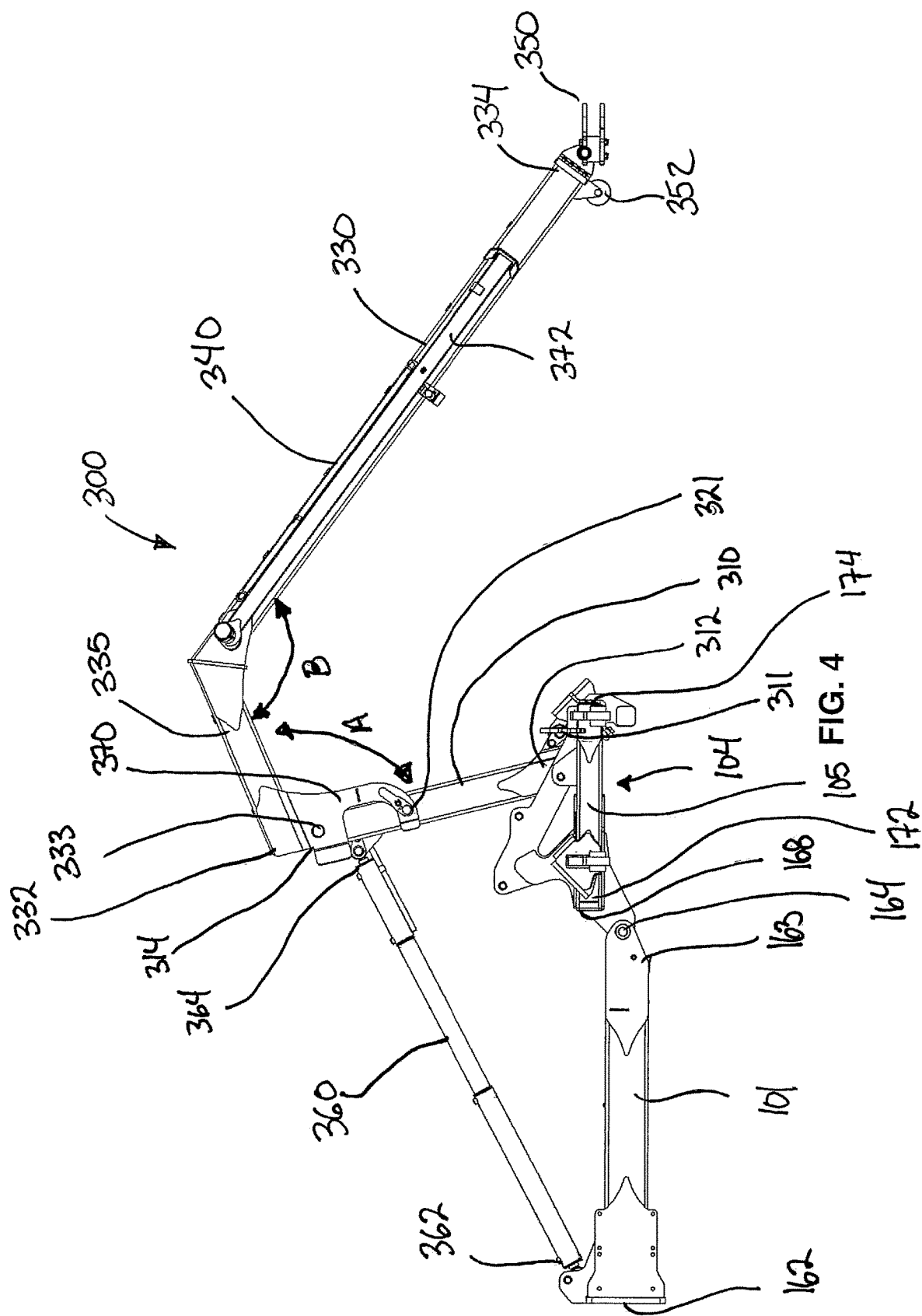
FIG. 4 is a side view of the rear tow hitch assembly and the portion of the first implement shown in FIG. 3.
Figure 5:
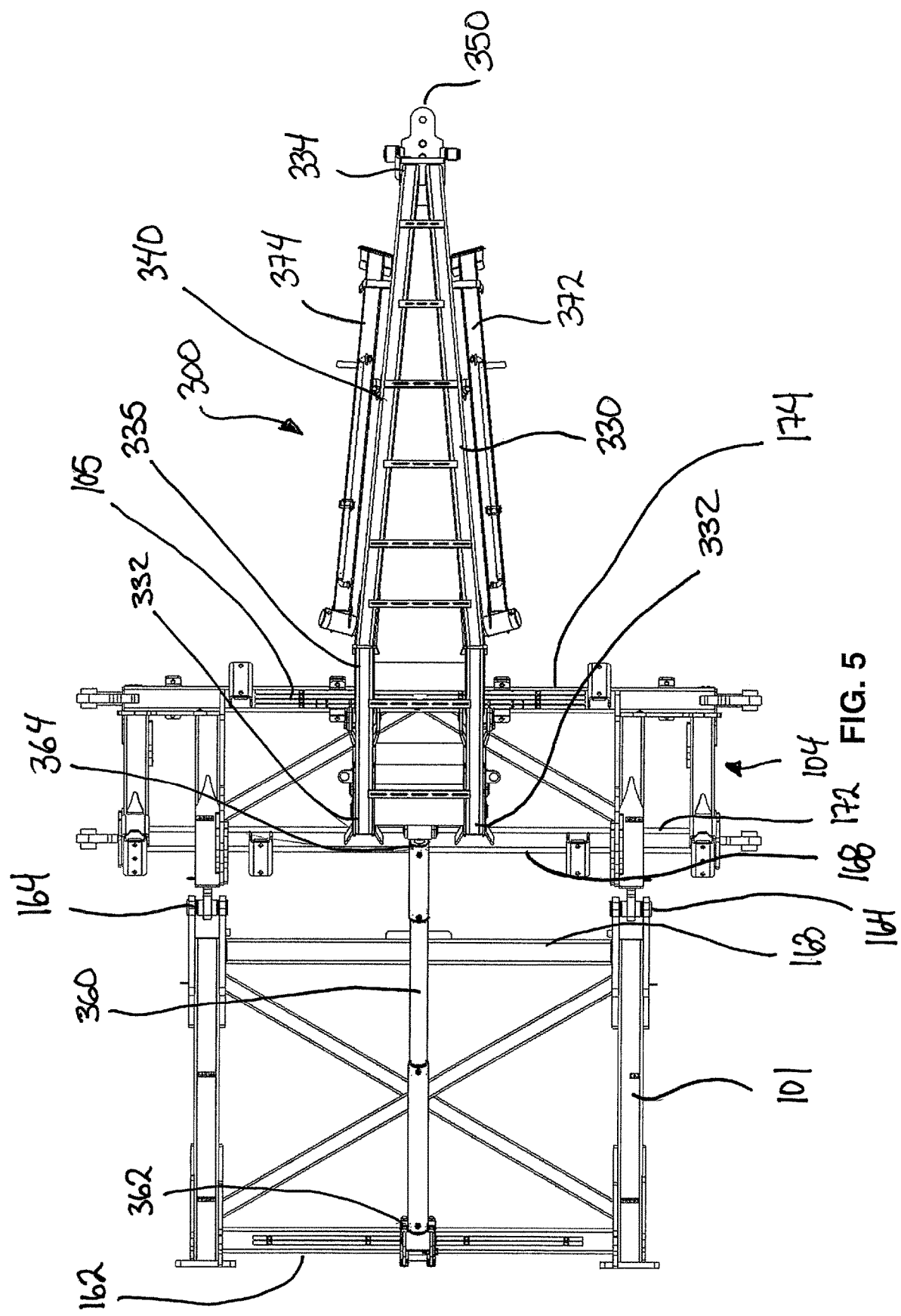
FIG. 5 is a top view of the rear tow hitch assembly and the portion of the first implement shown in FIG. 3.
Figure 6:
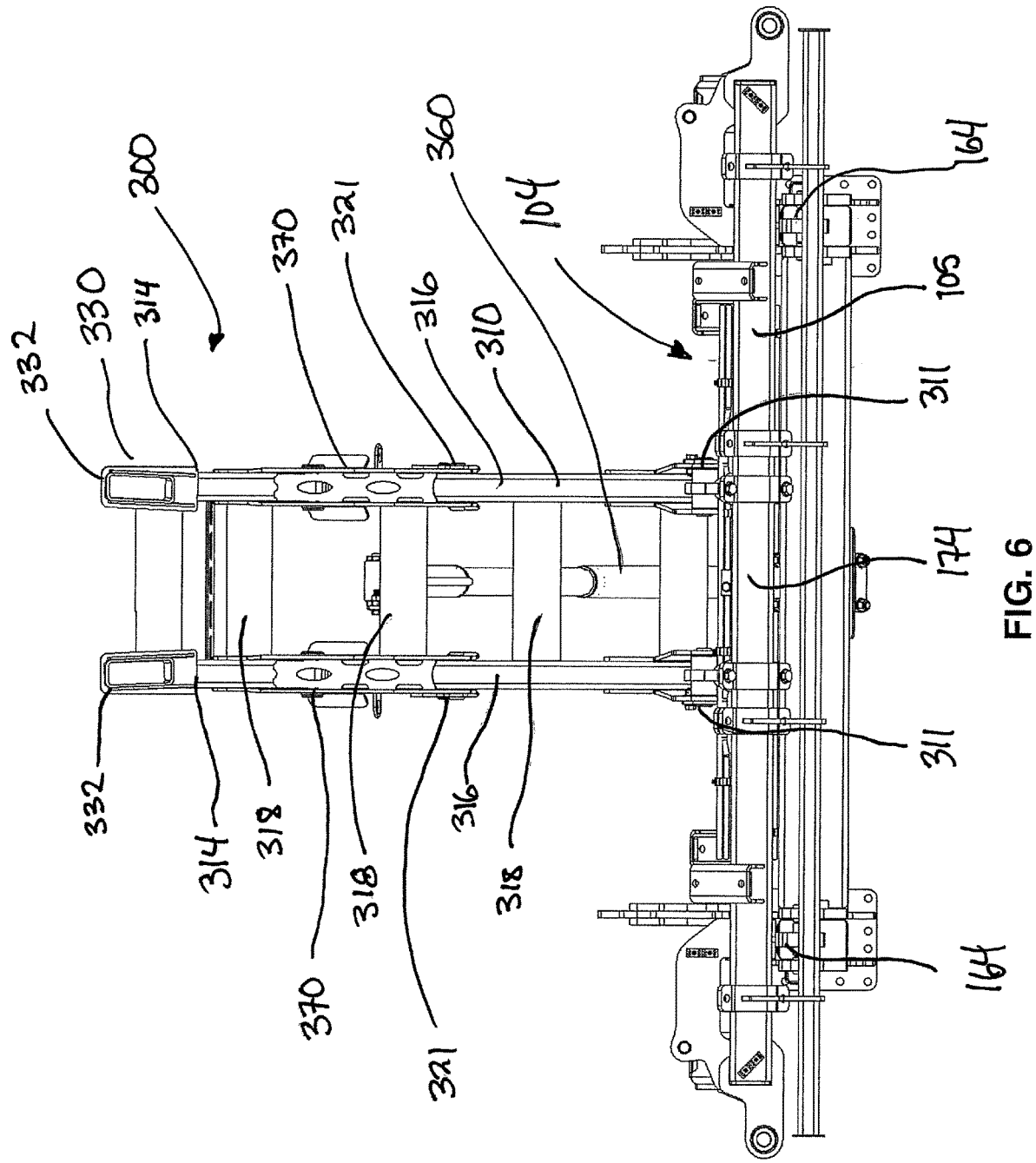
FIG. 6 is a rear view of the rear tow hitch assembly and the portion of the first implement shown in FIG. 3.

Connection members 370 can extend out and at an angle from the sides of the arched frame 330 and can be secured to the sides of the main support frame 310 to connect the arched frame 330 to the main support frame 310. The connection members 370 can extend at an angle greater than 90° from the arched frame 330 so that an angle between the arched frame 330 and the connection members 370, is greater than 90°. In this manner, when the arched frame 330 is connected to the main support frame 310 and secured in place using the connection members 370, the angle between the arched frame 330 and the main support frame 310, shown as angle A in FIG. 4, is greater than 90°.

The arched frame 330 can have a shape that will allow the rear tow frame 300 to clear both the work tool assembly 104 and a finishing tool 108 (or other tool connected behind a center section 200 of the work tool assembly 104) both when the work tool assembly 104 is positioned substantially horizontally in the operating position and when the work tool assembly 104 is pivoted substantially vertically in the transport position.

The arched frame 330 can have a first section 335 and a second section 340 where the second section 340 can be angled downwards relative to the first section 335. The angle between the first section 335 and the second section 340, angle B shown in FIG. 4, can be greater than 90° but less than 180° so that while the first section 335 of the arched frame 330 angled upwards from where it was connected to the main support frame 310, the second section 340 is angled downwards so that the second section 340 can extend downwards towards a ground surface.

The first section 335 can be formed from a pair of parallel spaced members with lateral members running between the pair of parallel spaced members to form a ladder frame. The second section 340 can have a pair of side members that are angled towards one another as they extend towards the second end 334 of the arched frame 330 where the rear hitch 350 is provided. A series of lateral members can extend between the two side members.

The positioning actuator 360 can be connected between the main support frame 310 of the rear tow hitch assembly 300 and the frame 101 with a first end 362 of the positioning actuator 360 connected to a front end 162 of the frame 101 and a second end 364 of the positioning actuator 360 connected proximate the second end 314 of the main support frame 310. The positioning actuator 360 can be used rotate the main support frame 310 around the pivot point 311 and thereby position the main support frame 310 when the arched frame 330 is to be connected or disconnected from the main support frame 310.

The rear hitch 350 can be connected to the second end 334 of the arched frame 330 to allow a second implement to be connected to the second end 334 of the arched frame 330. The hitch wheel 352 can be provided on the second end 334 of the arched frame 330 to allow the second end 334 of the arched frame 330 to roll along a ground surface when the arched frame 330 is being connected or disconnected from the main support frame 310.

In a further aspect, a ski or skid could be used in place of the hitch wheel 352.

In one aspect, a floating member (not shown) can be connected between the rear hitch 350 on the rear tow hitch assembly 300 and where the second implement is connected (such as a tongue hitch on the second implement). This floating member can simply be a rigid tube, beam or other member with a clevis or tongue hitch that connects between the rear hitch 350 and the hitch on the second implement. This floating member can allow the rear hitch 350 to move up and down vertically somewhat in response to movement of the rear tow hitch assembly 300 without the second implement being disconnected from the rear to hitch assembly 300.

The first support leg 372 and the second support leg 374 can be provided for supporting the arched frame 330 in an upright position when the arched frame 330 is not connected to the main support frame 310. In one aspect, the first support leg 372 and the second support leg 374 can be connected to outsides of the side members of the second section 340 of the arched frame 330.

Referring again to FIGS. 1 and 2, the first implement 100 can have a tow assembly 102 that is connected to a front end 162 of the frame 101 to allow a tractor (not shown) or other tow vehicle to tow the first implement 100 in a direction of travel, D. The tow assembly 102 can comprise a manual connection or an electronic/automated connection with the tow vehicle. The tow assembly 102 can be disconnected from a tow vehicle when the first implement 100 is not in use and may be reattached when the first implement 100 is to be used. The tow assembly 102 can comprise an A-frame with a horizontal beam disposed between and attached to slanted vertical beams. The apex of the slanted vertical beams can comprise the attachment point of the tow assembly 102 to the tow vehicle. The tow assembly 102 can be attached to the front end 162 of the frame 101 with mechanical fasteners, welding, or any other suitable connection means.

The frame 101 can be attached at its front end 162 to the tow assembly 102 and the cultivating assembly 104 can be pivotally connected to the frame 101 at the rear end 163 so that the work tool assembly 104 is positioned behind the frame 101 and the ground wheels 103 and support wheels 150 are positioned in front of the work assembly 104 when the first implement 100 is used to prepare a field. The frame 101 can take many suitable forms and can include horizontally crisscrossing beams and/or an integral "X" shaped beam, or any other added support. In some embodiments, the beams may run between the inner corners of the frame 101 for added stability and to reduce the risk of damage to the first implement 100. In alternative embodiments, the beams may run horizontally, vertically, diagonally, etc.

Figure 7:
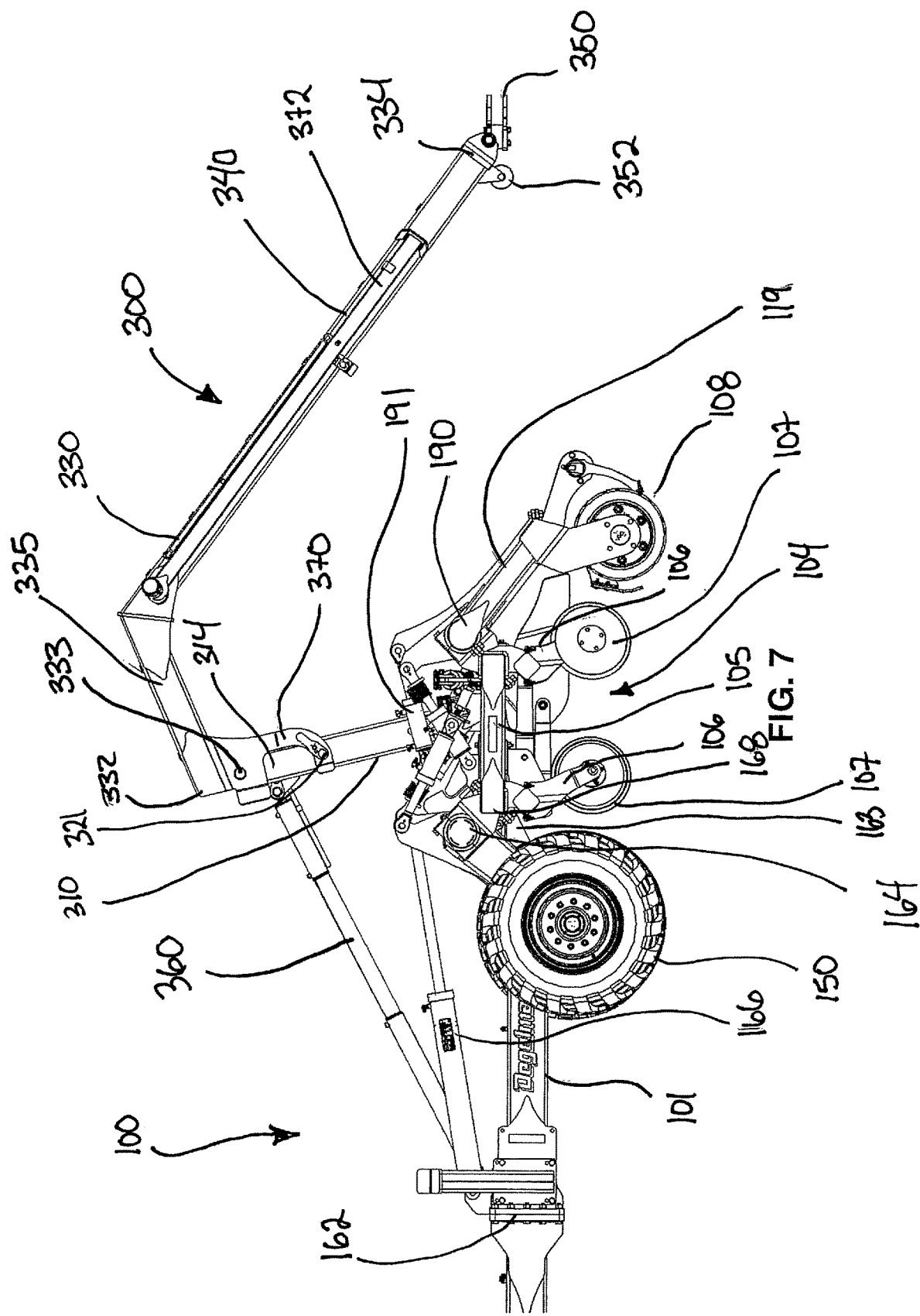
FIG. 7 is a detailed side view of the first implement of FIG. 1 with the rear tow hitch assembly attached.
Figure 8:
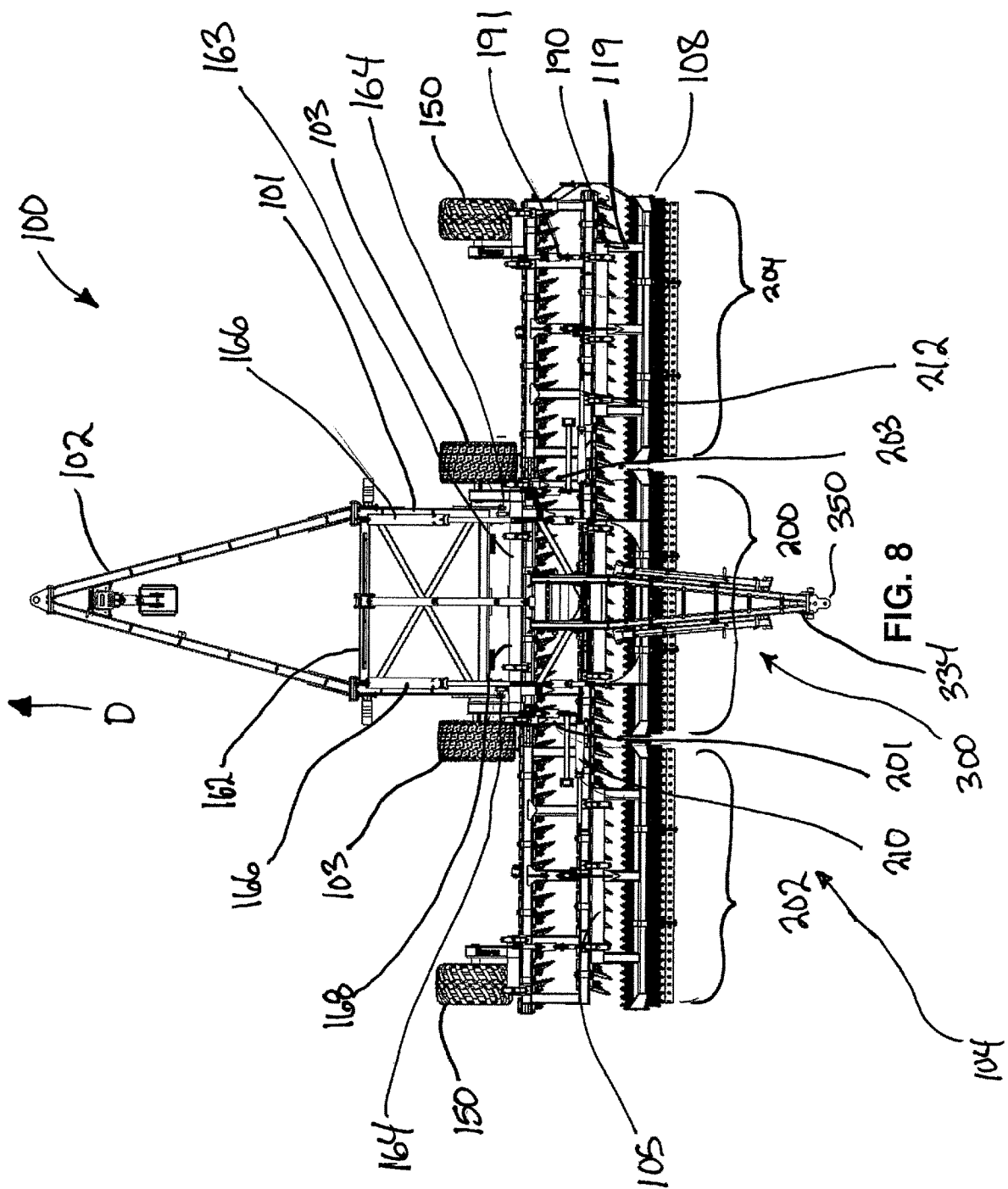
FIG. 8 is a top view of the first implement of FIG. 1.

A front end 168 of the work tool assembly 104 can be pivotally attached to a rear end 163 of the frame 101 so that the work tool assembly 104 can pivot around an axis that is substantially perpendicular to the direction of travel D and allows the work tool assembly 104 to be positioned behind the frame 101 when the first implement 100 is in use in a field. FIGS. 7 and 8 illustrate a more detailed view of the work tool assembly 104 and a top view of the first implement 100, respectively, with the rear tow hitch assembly 300 attached. The work tool assembly 104 can comprise a carriage frame 105, a plurality of arms 106 connected below the carriage frame 105 and supporting a plurality of work tools 107 (in the figures the work tools 107 are shown as discs, but any number of different work tools could be used), and a finishing tool 108 pivotally connected to the carriage frame 105 by a finishing tool mount 119. If the work tools 107 are discs, the work tool assembly 104 can prepare the field for the planting of a crop using the work tools 107 of the work tool assembly 104 to break and mix up the soil as the discs come into contact and pass through the soil below the work tool assembly 104 as a tow vehicle pulls the first implement 100 through a field in the direction of travel D. The work tools 107 can penetrate the soil, pulverize clods of soil and mix soil and crop residues as the discs are pulled through the soil. The finisher 108 can then pass along the soil that has been mixed up by the discs to level out the soil the discs have passed through.

In one aspect, the plurality of work tools 107 can be arranged in rows. Referring to FIG. 1, the first implement 100 can have a first row of work tools 110 and a second row of work tools 111 positioned behind the first row of work tools 110. In this manner, soil that is passed over by the work tool assembly 104 will first pass by the first row of work tools 110 and then the second row of work tools 111. If the work tools 107 are discs, all of the work tools 107 in the first row of work tools 110 can be angled in a first direction by the arms 106 while all the work tools 107 in the second row of work tools 111 can be angled in a second direction by the arms 106 where the second direction is opposite to the first direction. Again, if the work tools 107 are discs, the discs in the first row of work tools 110 and the discs in the second row of work tools work tools 111 can have different directions of concavity with the discs in the first row of work tools 110 rounding outwards in one direction and the discs in the second row of work tools 111 rounding outwards in an opposite direction, such that they work in tandem to properly cultivate the soil. In this manner, as the discs pass through and over the soil, the discs in the first row of work tools 110 can pierce the soil at one angle and the discs in the second row of work tools 111 can pierce the soil at a second angle opposite to a first angle in order to pass over the soil twice and better mix and level the soil.

In one aspect, the carriage frame 105 can include two substantially parallel beams: a front beam 172 and a rear beam 174 to allow work tools 107 to be operatively connected to the front beam 172 and rear beam 174.

Figure 9:
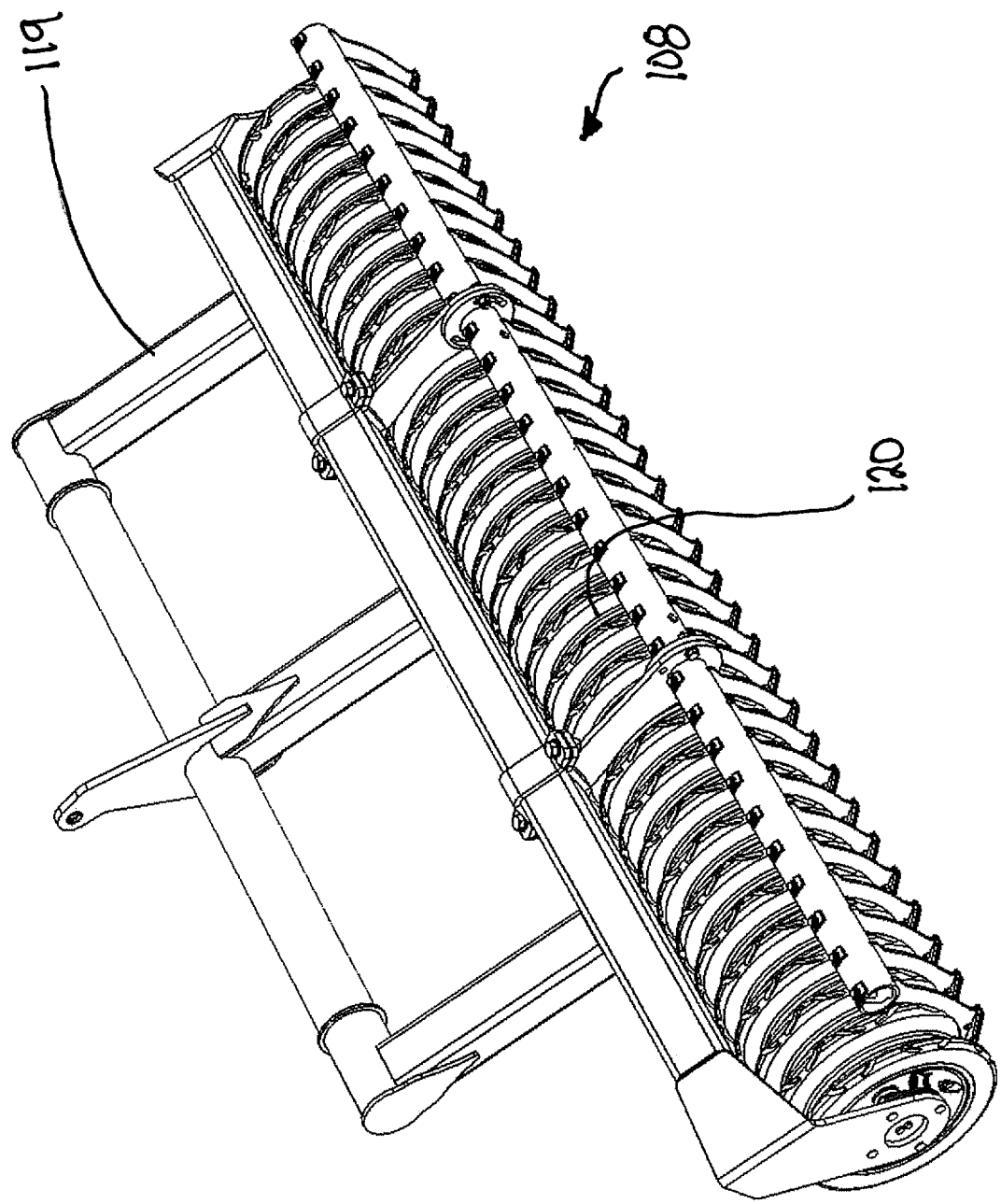
FIG. 9 is a perspective view of a finishing tool for the first implement.

FIG. 9 illustrates a finishing tool 108 in one aspect. The finishing tools 108 is used to level out the soil after the work tools 107 pass through it an can comprise any suitable finishing tools. In one aspect, a cultipacker 120 can be used to level out the soil the finishing tool 108 passes over, however, any number of suitable elements may be used in the finishing tool 108. For example, in one embodiment, the finishing tools 108 may comprise a spiked roller, a smooth pipe roller, a mounted basket or the like. In another embodiment, the finishing tool 108 may comprise a roller that is used to flatten or create a ribbed texture or appearance in the loosened soil and break up large clumps of soil after the work tools 107 have passed over and through the soil.

The finishing tool 108 can be provided in a finishing tool mount 119 that can be pivotally connected to the carriage frame 105. The finishing tool mount 119 may be adapted to receive a finishing tool 108, such as a roller, and allow the roller to rotate about an axis passing through the ends of the finishing tool mount 119. The finishing tool mount 119 can be pivotally attached to the carriage frame 105 so that the finishing tool 108 can be moved upwards and downwards relative to the carriage frame 105 by pivoting around pivot point 190.

An actuator 191, such as a hydraulic cylinder, etc. can be attached between the carriage 105 and the finishing tool mount 119 and used to rotate the finishing tool 108 around the pivot point 190. In this manner, the finishing tool 108 can be moved downwards and upwards relative to the height of the work tools 107 by pivoting it around pivot point 190 using the actuator 191. This allows the depth the work tools 107 are set to penetrate the soil to be varied by altering the height of the finishing tool 108 relative to the work tools 107 by pivoting the finishing tool mount 119 and around pivot point 190 using the actuator 191.

When the finishing tool 108 is connected behind the work tool assembly 104, the rear tow hitch assembly 300 must be able to clear both the work tool assembly 104 and the finishing tool 108 to connect to a second implement positioned behind the finishing tool 108.

Referring again to FIG. 2 the working assembly 104 can have a number of different sections including: a center section 200; a first wing section 202; and a second wing section 204. The center section 200 of the work tool assembly 104 can be pivotally connected to the rear end 163 of the frame 101 at a pivotal connection 164 so that the work tool assembly 104 can be pivoted around the pivotal connection 164 relative to the frame 101 which forms an axis substantially perpendicular to the direction of travel D.

The rear tow hitch assembly 300 can be attached to the rear of the center section 200 so that when the center section 200 is pivoted upwards relative to the frame 101, the main support frame 310 and the arched frame 330 will move with the moving center section 200, with the main support frame 310 pivoting around its first end 312 that is attached to the center section 200. This pivoting of the main support frame 310 relative to the center section 200 and the configuration of the arched frame 330 will allow a second implement attached to the rear hitch 350 on the second end 334 of the arched frame 330 to remain hitched to the second implement while the center section 200 pivots upwards and towards the frame 101.

Figure 10:
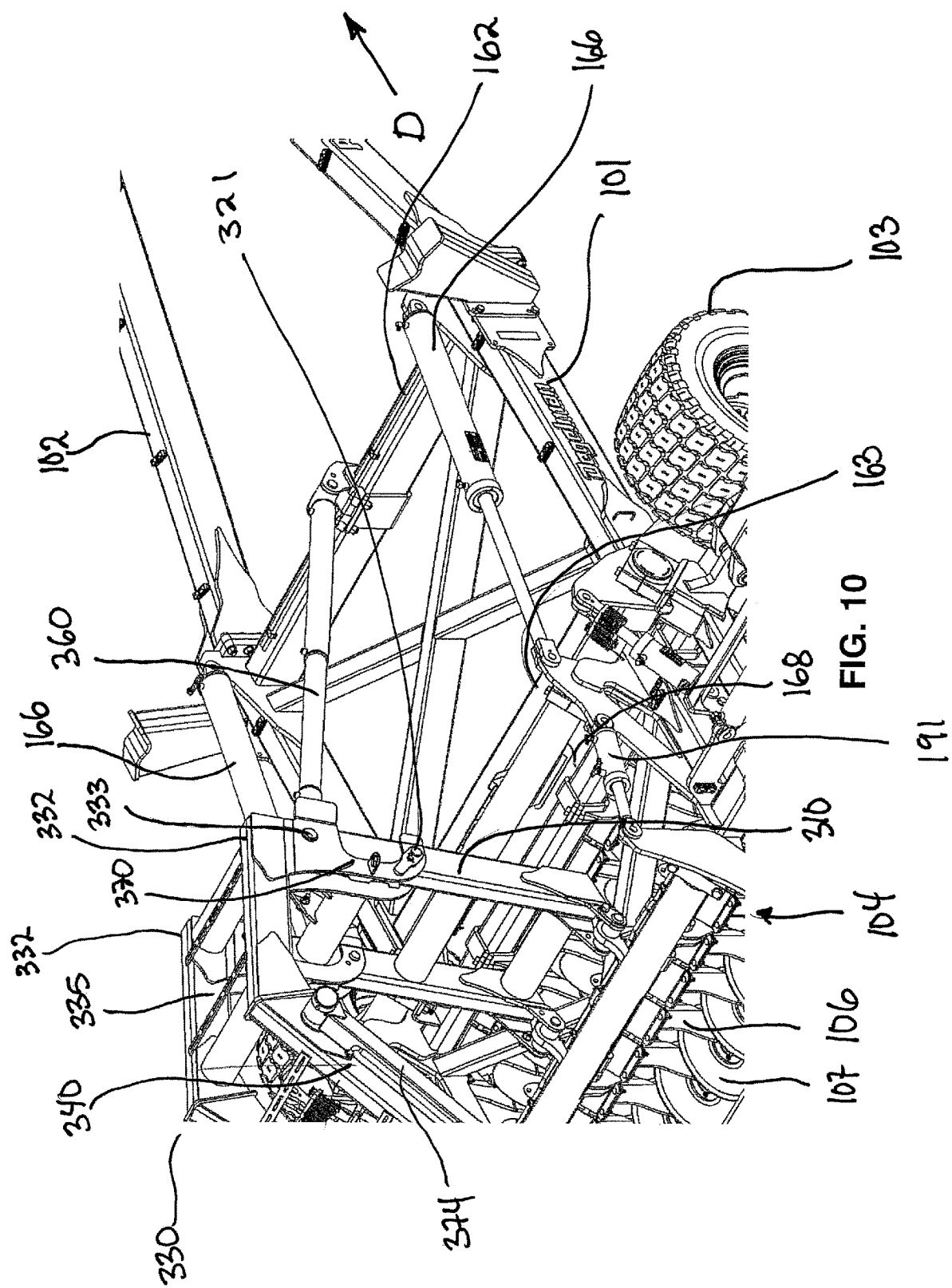
FIG. 10 is a close up perspective view of a center section and a frame of the first implement of FIG. 1.
Figure 11:
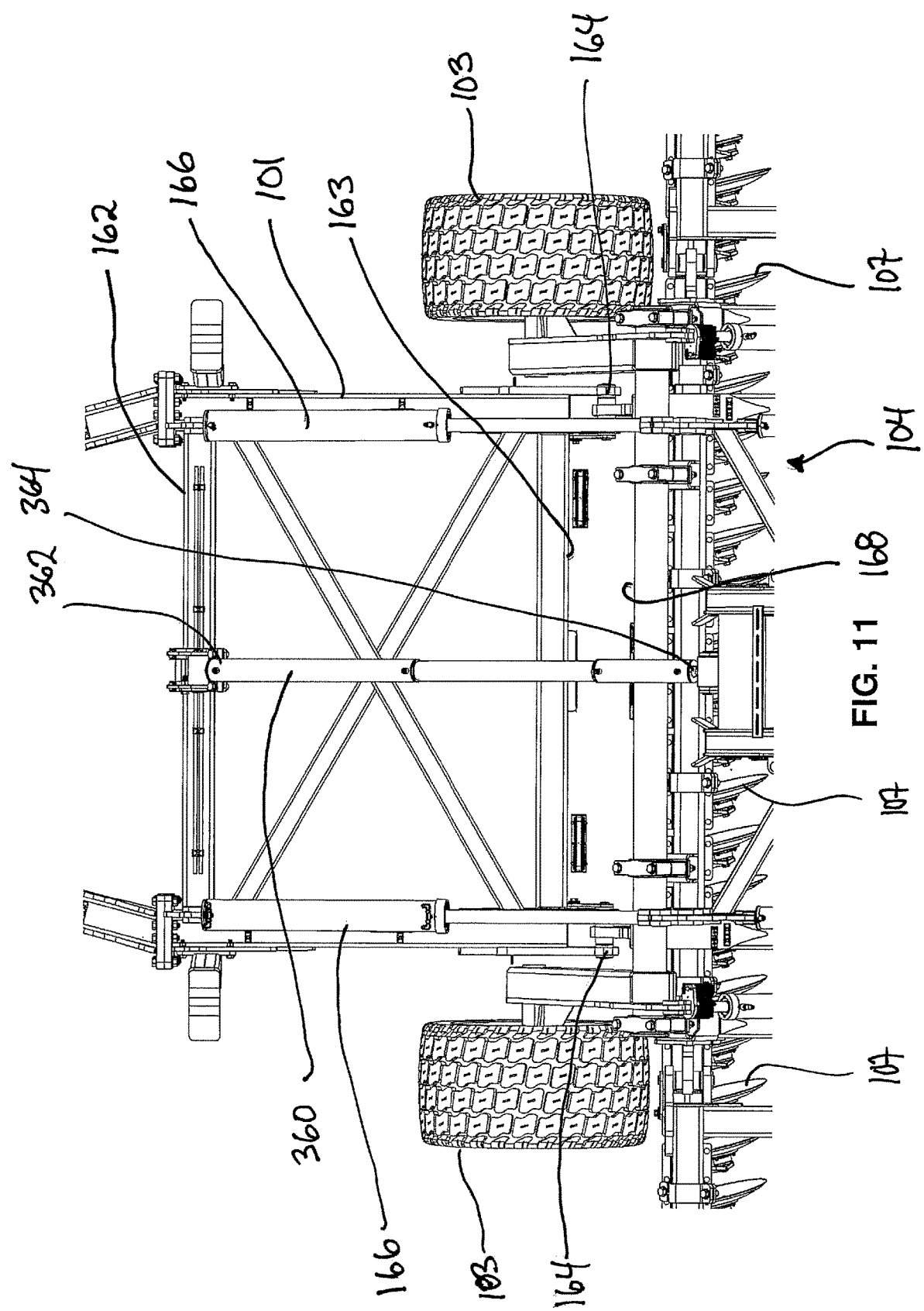
FIG. 11 is a close up top view of the center section and the frame of FIG. 10.

FIGS. 10 and 11 illustrate more detailed views of the connection between the center section 200 of the work tool assembly 104 and the frame 101. A pair of actuators 166 can be provided between the frame 101 and the work tool assembly 104 that supports the work tools 107. The actuators 166 can take the form of hydraulic cylinders or any other suitable actuator. The actuators 166 can rotate the work tool assembly 104 relative to the frame 101 and around the pivot point 164. In this manner, the work tool assembly 104 can be raised or lowered relative to the frame 101 by pivoting it around pivot point 164 using the actuators 166. The first implement 100 can pivot the entire work tool assembly 104 upwards and downwards relative to the frame 101 and around an axis perpendicular to the direction of travel D at the front end 168 of the work tool assembly 104 allowing the entire work tool assembly 104 to be lifted so that the work tools 107 and the finishing tool 108 can be lifted away from the ground surface. When the work tool assembly 104 is pivoted upwards so that the work tools 107 are out of contact with the ground, the ground wheels 103 and support wheels 150 can remain in contact with the ground surface and can be the only part of the first implement 100 that is in contact with the ground. In one aspect, if the finishing tool 108 is a cultipacker 120, the cultipacker 120 may remain in contact with the ground during turns while the work tools 107 are lifted out of contact with the ground. This allows an operator to lift the entire work tool assembly 104 off of the ground when turning around at the end of a row in a field, and turn the first implement 100 with only the ground wheels 103 and support wheels 150 in contact with the surface of the field. This also allows an operator to lift the entire first implement assembly 104 off of the ground in order to drive forward, back up, unplug the work tool assembly 104 or drive away from a predicament in a field. The shape of the rear tow hitch assembly 300 allows the rear tow hitch assembly 300 to clear the work tool assembly 104 while the work tool assembly 104 is raised off of and put back down on the ground with the second implement remaining attached to the rear tow hitch assembly 300 the entire time.

Referring again to FIG. 8, the first wing section 202 and the second wing section 204 can be pivotally attached to the center section 200. The first wing section 202 can be pivotally attached at one end to a first side 201 of the center section 200 and one end of the second wing section 204 can be pivotally attached at one end to a second side 203 of the center section 200. In one aspect, a first actuators 210, such as a hydraulic cylinder, etc., can be provided between the center section 200 and the first wing section 202 and a second actuator 212, such as a hydraulic cylinder, etc., can be provided between the center section 200 and the second wing section 204 with the first actuator 210 and the second actuator 212 able to be retracted so that the first wing section 202 and the second wing section 204, respectively, are pivoted upwards relative to the center section 200 so that the first wing section 202 and second wing section 204 can be moved inwards towards the center of the first implement 100 and towards a position where the first wing section 202 and the second wing section 204 are perpendicular or even acutely angled to the center section 200.

By having the first wing section 202 and the second wing section 204 pivotally connected to the sides 201, 203 of the center section 200, the sections of the work tool assembly 104 can "float" and follow the curvature of varying terrain. If the first actuator 210 and second actuator 212 are hydraulic cylinders, they can be allowed to extend and retract freely or "float" allowing the first wing section 202, center section 200 and second wing section 204 to all pivot relative to one another. In this manner, these three independent sections of the work tool assembly 104 can allow side to side contouring for steep inclines, downward slopes, low mounds, side hill slopes and/or ridges, etc.

By allowing the work tool assembly 104 to pivot freely relative to frame 101, the first implement 100 can also float from front to back. This can be achieved by allowing the actuators 166 to freely retract and extend or "float" if they are hydraulic cylinders. This can allow the first implement 100, if it is a cultivator, to better cultivate hills or other ascents or descents present in a field being cultivated.

The pivotal connection of the first end 312 of the main support frame 310 and the shape of the main support frame 310 and the arched frame 330 allow a second implement attached to the rear hitch 350 on the second end 334 of the arched frame 330 to remain connected to the rear hitch 350 on the rear tow hitch assembly 330 while the rear tow hitch assembly 330 clears the work tool assembly 104 and any finishing tools 108 connected behind the work tool assembly 104, while the work assembly 104 "floats" relative to the frame 101.

The first wing section 202, the second wing section 204, the center section 200 and the rear tow hitch assembly 300 can also allow the first implement 100 to be positioned in a transport position while a second implement remains hitched to the rear hitch 350 on the second end 334 of the rear tow hitch assembly 330.

Referring again to FIG. 2, the first implement 100 can be provided with ground wheel 103 and support wheels 150 so that the first implement 100 can be pulled through a field by a tractor or other tow vehicle and some of the weight of the first implement 100 is supported by the ground wheels 103 and the support wheels 150. The ground wheels 103 and support wheels 150 are positioned so that they are provided in front of the work tool assembly 104 when the first implement 100 is in use. In this manner, any soil in the field that the ground wheels 103 or support wheels 150 pass over is passed over by the work tools 107 and finishing tool 108 of the work tool assembly 104.

Figure 12:
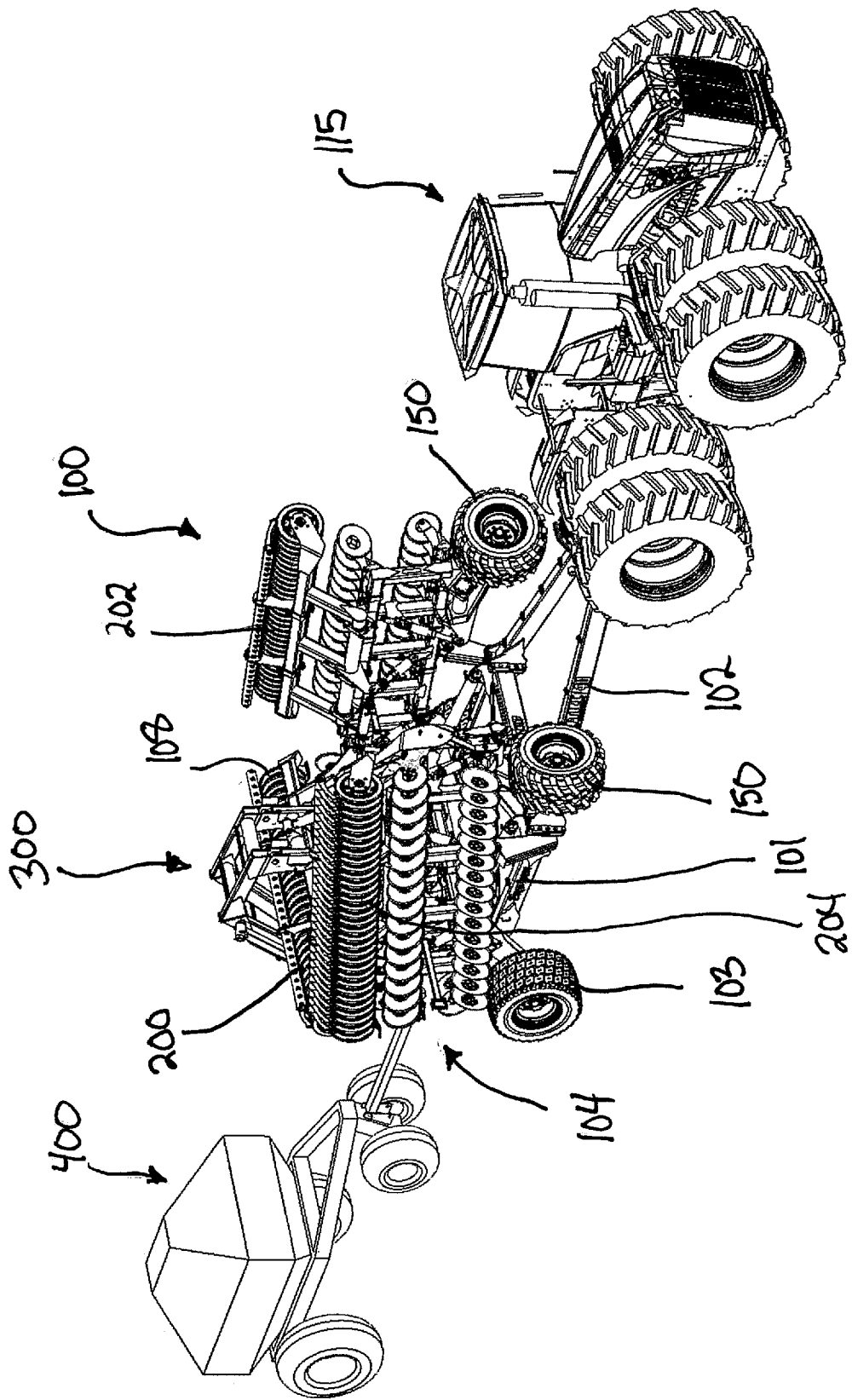
FIG. 12 is a perspective view of a tow vehicle towing a first agricultural implement (a cultivator) in a transport position with a second agricultural implement (a seed cart) attached to a rear tow hitch assembly on the first agricultural implement so that the second agricultural implement is towed behind the first agricultural implement.
Figure 13:
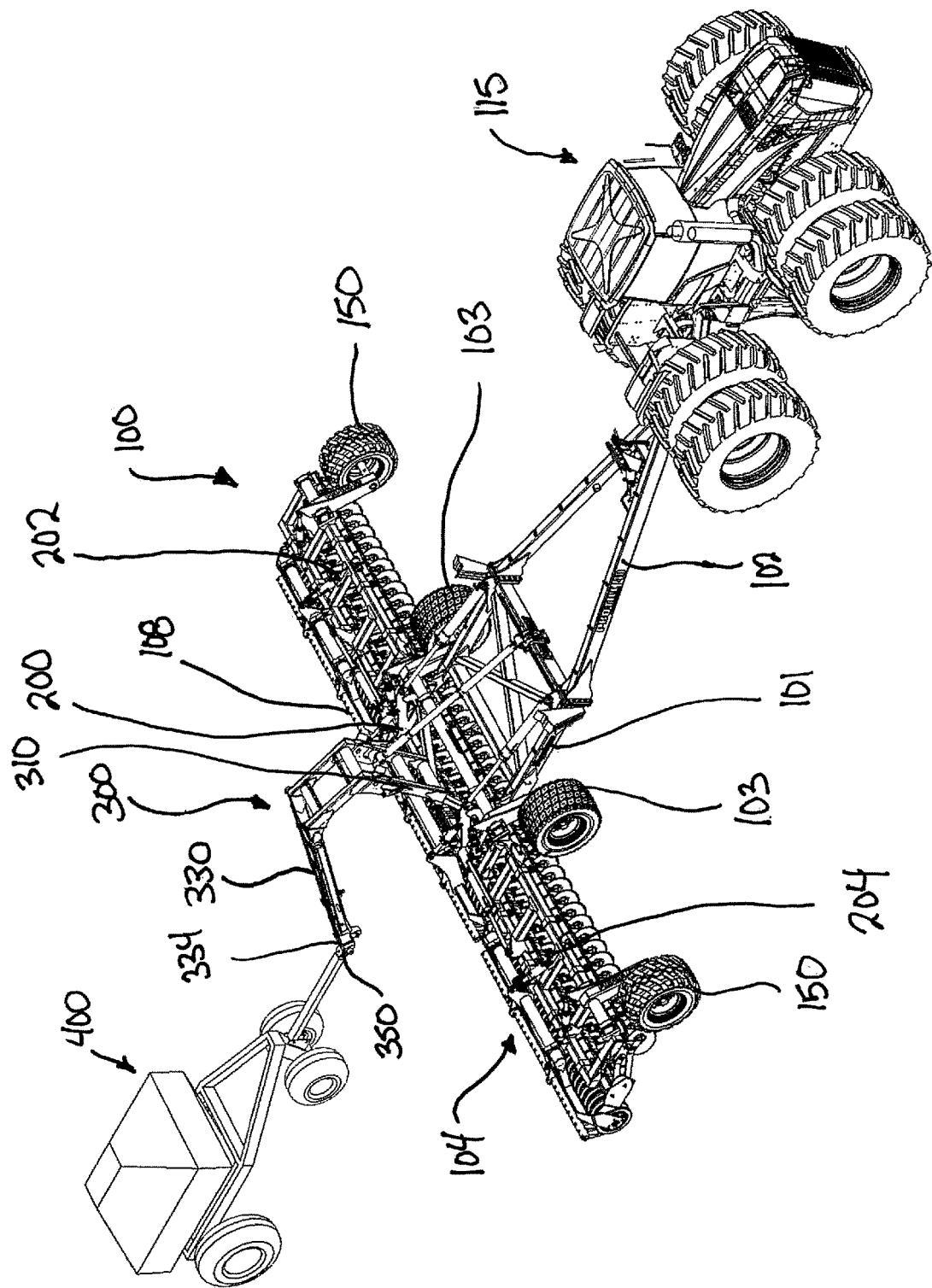
FIG. 13 is a perspective view of the first agricultural implement in an operating position with the second agricultural implement attached to the rear tow hitch assembly on the first agricultural implement and towed behind the first agricultural implement.

The first implement 100 can be transformed between a transport position (shown in FIG. 12), where the first implement 100 rides only on the ground wheels 103 and the overall width of the work tool assembly 104 is significantly reduced while a second implement remains hitched to the rear hitch 350 of the rear tow hitch assembly 300, and an operating position (shown in FIG. 13), so that the first implement 100 can be used in a field. The transport mode makes the transport of the first implement 100 easier which is especially useful on roads where the first implement 100 in the transport position and the second implement being towed are narrow enough to travel on the roads and still be low enough to pass under many bridges, power lines and other overhead obstacles. FIG. 12 illustrates the first implement 100 and a second implement 400 being pulled by a tow vehicle 115 (such as a tractor) while the first implement 100 is in its transport position.

To place the first implement 100 in the transport position, the work tool assembly 104 can be pivoted upwards around pivot point 164 by actuators 166 so that the work tool assembly 104 is lifted off of the ground while the ground wheels 103 and support wheels 150 remain on the ground. While the work tool assembly 104 is being pivoted upwards and towards the frame 101 around pivot point 164, the rear tow hitch assembly 300 can move upwards and be pivoted around the pivot point 311 at the rear of the center section 200, where the rear tow hitch assembly 300 is pivotally connected to the center section 200 of the work tool assembly 104. The tow hitch assembly 300 can pivot around the pivot point 311 in an opposite direction to the direction the work tool assembly 104 is pivoting around pivot point 164. The rear hitch 350 will be hitched to a second implement behind the first implement 100 and as the center section 200 pivots around pivot point 164 and towards the frame 101, the main support frame 310 will move upwards while pivoting around pivot point 311 in the opposite direction that the center section 200 is pivoting around pivot point 164 keeping the rear hitch 350 on the second end 334 of the arched frame 330 in the same position or substantially the same position (if a floating member is used to between the rear hitch 350 and a hitch on the second implement) as the work tool assembly 104 is rotated upwards to the frame 101 and around the pivot point 164. The shape of the arched frame 330 will allow the rear tow hitch assembly 300 to clear the center section 200 and any finishing tool 108 attached to the back of the center section 200 without the rear tow hitch assembly 300 contacting the center section 200 or the finishing tool 108 while the first implement 100 is moved into the transport position.

In one aspect, before the work tool assembly 104 is being rotated upwards to place the first implement 100 in the transport position, the positioning actuator 360 connected to the main support frame 310 can be retracted and locked so that the length of the positioning actuator 360 remains fixed. This will keep the distance between first end 362 of the positioning actuator 360 where it is attached to the front end 162 of the frame 101 and the second end 364 of the positioning actuator 360 where it is connected to the main support frame 310 a fixed distance apart and control the movement of the main support frame 310 causing the main support frame 310 to pivot around pivot point 311 in the opposite direction that the center section 200 is pivoting around pivot point 164. In another aspect, the positioning actuator 360 could be replaced with a fixed member to cause the same type of movement of the main support frame 310.

The entire work tool assembly 104 can continue to be rotated upwards around the pivot point 164 until the work tool assembly 104 is near perpendicular to the frame 101 with the first end 312 of the main support frame 310 moved upwards from where it was positioned when the first implement 100 is in the operating position and rotated so that the second end 314 of the main support frame 310 is moved to allow the arched frame 330 to extend downwards so that the rear hitch 350 remains connected to the second implement.

When the entire work tool assembly 104 has been pivoted upwards, the first wing section 202 and the second wing section 204 can be pivoted relative to the center section 200 so that the first wing section 202 and the second wing section 204 are pivoted in towards the frame 101 as shown in FIG. 12.

Referring again to FIG. 12 the first implement 100 is shown in the transport position and towing a second implement 400 connected behind the first implement 100 by the rear tow hitch assembly 300. The rear tow hitch assembly 300 has pivoted in response to the pivoting of the center section 200 and the rear tow hitch assembly 300 clears the center section 200 and a finishing tool 108 connected behind the center section 200 so that the second implement 400 remains connected to the rear hitch 350 on the rear tow hitch assembly 300 for transport.

Figure 15:
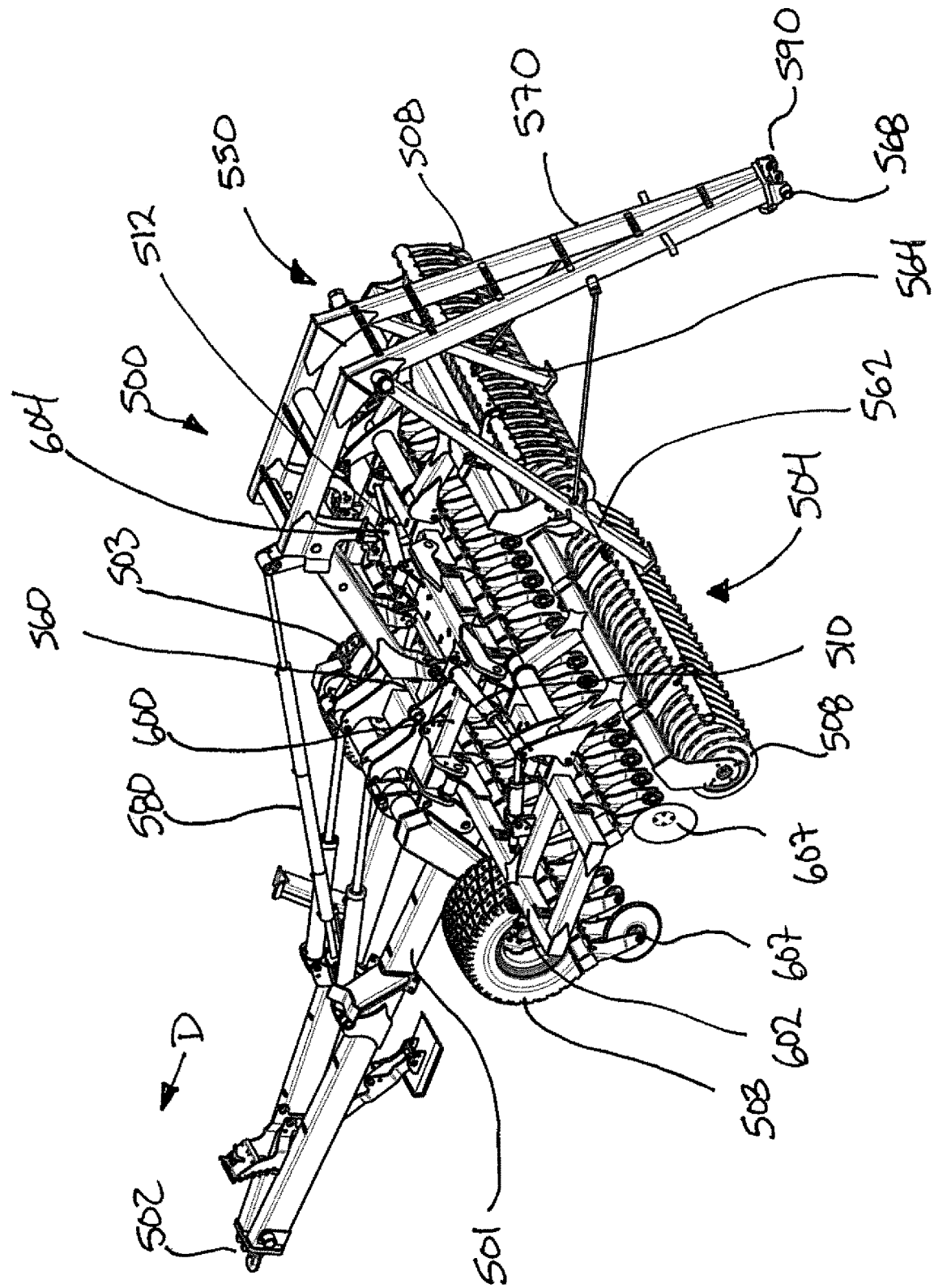
FIG. 15 is a perspective view of a first agricultural implement in a further aspect.
Figure 16:
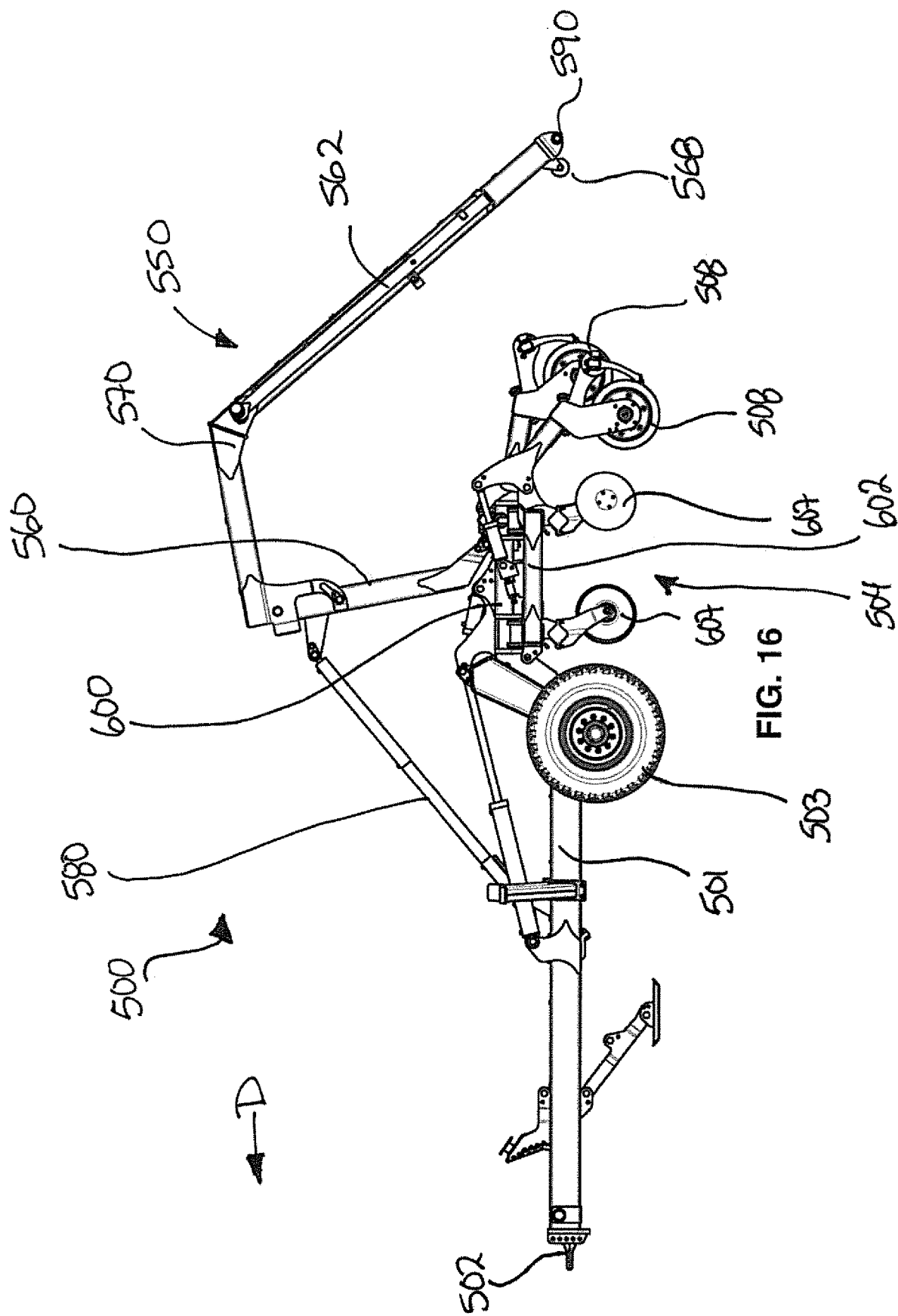
FIG. 16 is a side view of the first agricultural implement shown in FIG. 15 in an operating position.

In a further aspect, a first implement 500 is shown in FIG. 15-10 where a center section 600 has a rear tow hitch assembly 550 attached to the center section 600, but the center section 600 does not have any work tools connected directly to it. Instead, the center section 600 is pivotally connected to a first side wing 602 and a second side wing 604 which are connected to work tool 607 and the center section 600 acts as a connection for the first side wing 602 and the second side wing 604 and support for the rear tow hitch assembly 550. The first implement 500 has a work tool assembly 504 that contains the center section 600, the first wing section 602, a second wing section 604 and the rear tow hitch assembly 550 provided on the center section 600. In one aspect, the center section 600 can be positioned above the first wing section 602 and the second wing section 604 when the first implement 500 is placed in the operating position.

The first implement 500 can include a frame 501 adapted to be towed across a field in a direction of travel D using a tow assembly 502, ground wheels 503, and the work tool assembly 504 attached to the frame 501. Like the first implement 100 shown in FIGS. 1-14, the first implement 500 can be transformed between an operating position for use in a field, with the work tool assembly 504 pivoted into a substantially horizontal position, and a transport position, with the work tool assembly 504 pivoted vertically for transport from one field to another, along a roadway, etc. and the first wing section 602 and the second wing section 604 pivoted towards a front of the first implement 500.

Unlike the center section 200 of the first implement 100, the center section 600 of this first implement 500 will not have any work tools attached to it, but rather will form a connection between the first wing section 602 and the second wing section 604. The center section 600 of the work tool assembly 504 can be pivotally connected to a rear end of the frame 501 at a pivotal connection so that the work tool assembly 504 can be pivoted around the pivotal connection relative to the frame 501 which forms an axis substantially perpendicular to the direction of travel D.

The first wing section 602 and the second wing section 604 can be pivotally attached to the center section 600. The first wing section 602 can be pivotally attached to a first side of the center section 600 and the second wing section 604 can be pivotally attached to a second side of the center section 600. A first actuator 510, such as a hydraulic cylinder, etc., can be provided between the center section 600 and the first wing section 602 and a second actuator 512, such as a hydraulic cylinder, etc., can be provided between the center section 600 and the second wing section 604 with the first actuator 510 and the second actuator 512 able to be retracted so that the first wing section 602 and the second wing section 604, respectively, are pivoted relative to the center section 600 moving the first wing section 602 and second wing section 604 inwards towards a center of the first implement 500 and towards a position where the first wing section 602 and the second wing section 604 are perpendicular or even acutely angled to the center section 600.

Work tools 607 can be provided connected below the first wing section 602 and the second wing section 604, but not the center section 600 so that the center section 600 acts as a joining member between the first wing section 602 and the second wing section 604 which carry the work tools 607. In one aspect, the first wing section 602 and second wing section 604 when placed in the operating position extend partially below the center section 600 so that ends of the first wing section 602 and the second wing section 604 are positioned adjacent one another and below the center section 600.

The rear tow hitch assembly 550 can include: a main support frame 560, an arched frame 570; a rear hitch 590; a hitch wheel 568; a positioning actuator 580; and a pair of support legs 562, 564. The rear tow hitch assembly 550 can be attached to the rear of the center section 600 so that when the center section 600 is pivoted upwards relative to the frame 501, the main support frame 560 and the arched frame 570 will move with the moving center section 600, with the main support frame 560 pivoting around a first end that is attached to the center section 600. This pivoting of the main support frame 560 relative to the center section 600 and the configuration of the arched frame 570 will allow a second implement attached to the rear hitch 590 on a second end of the arched frame 570 to remain hitched to the second implement while the center section 600 pivots upwards and towards the frame 501.

To place the first implement 500 in the transport position, the work tool assembly 504 can be pivoted upwards so that the work tool assembly 504 is lifted off of the ground while the ground wheels 503 remain on the ground. While the work tool assembly 504 is being pivoted upwards and towards the frame 501, the rear tow hitch assembly 550 can move upwards and be pivoted at the rear of the center section 600, where the rear tow hitch assembly 550 is pivotally connected to the center section 600 of the work tool assembly 504. The rear hitch 590 can be hitched to a second implement behind the first implement 500 and as the center section 600 pivots upwards and towards the frame 501, the main support frame 560 will move upwards while pivoting in the opposite direction that the center section 600 is pivoting towards the frame 501 keeping the rear hitch 590 on the arched frame 570 in the same position or substantially the same position and connected to the second implement as the as the work tool assembly 504 is rotated upwards. The shape of the arched frame 570 will allow the rear tow hitch assembly 550 to clear the center section 600 and any finishing tool 508 attached to the back of the first wing section 602 and/or the second wing section 604 without the rear tow hitch assembly 550 contacting the center section 608 or the finishing tool 508.

Figure 17:
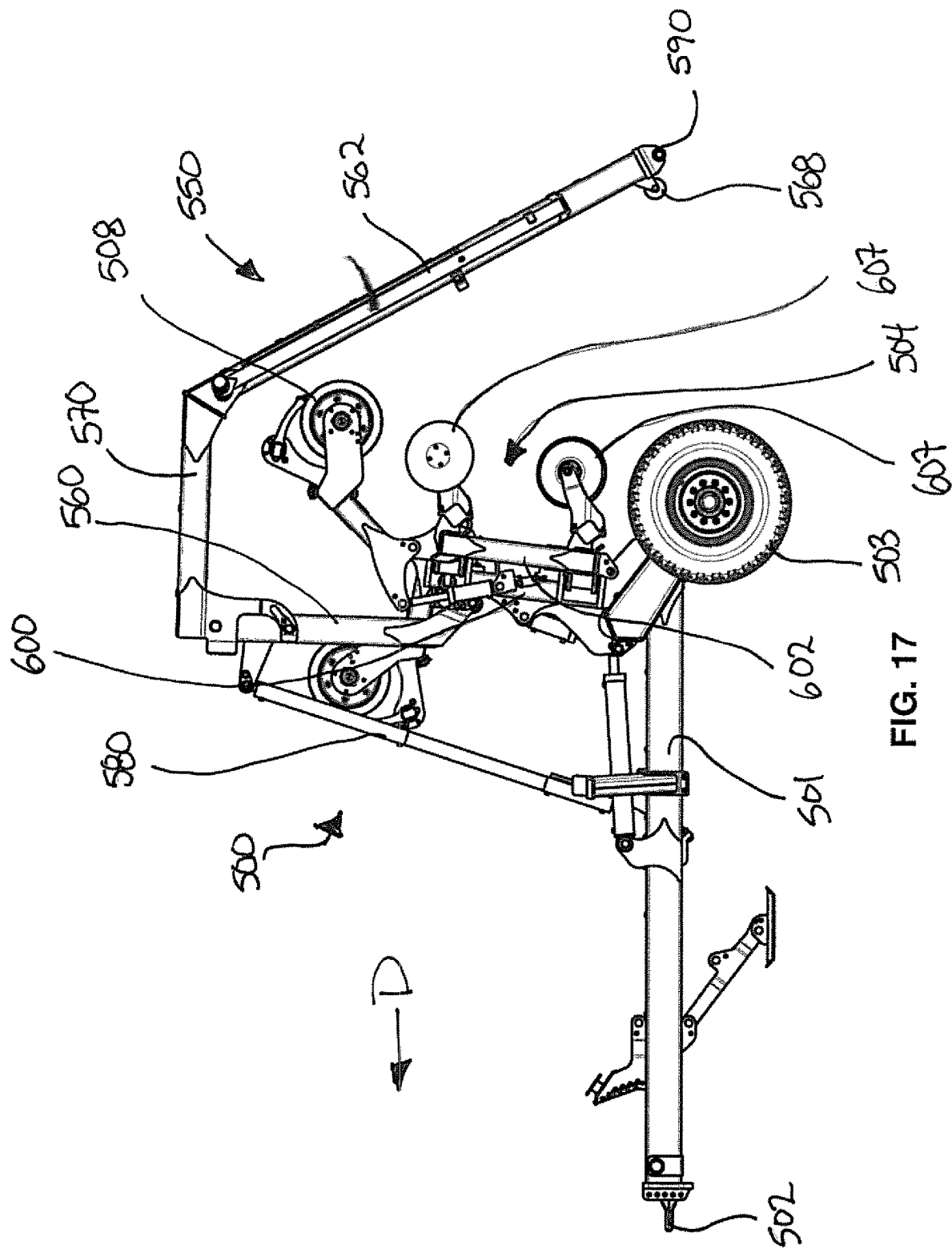
FIG. 17 is a side view of the first agricultural implement shown in FIG. 15 with a work tool assembly pivoted into a vertical position.

The entire work tool assembly 504 can continue to be rotated upwards until the work tool assembly 504 is near perpendicular to the frame 501, as shown in FIG. 17, with the main support frame 560 moved upwards from where it was positioned when the first implement 600 is in the operating position and rotated to allow the arched frame 570 to extend downwards so that the rear hitch 590 remains connected to the second implement.

The support wheels 150 will be lifted off of the ground surface.

Figure 18:
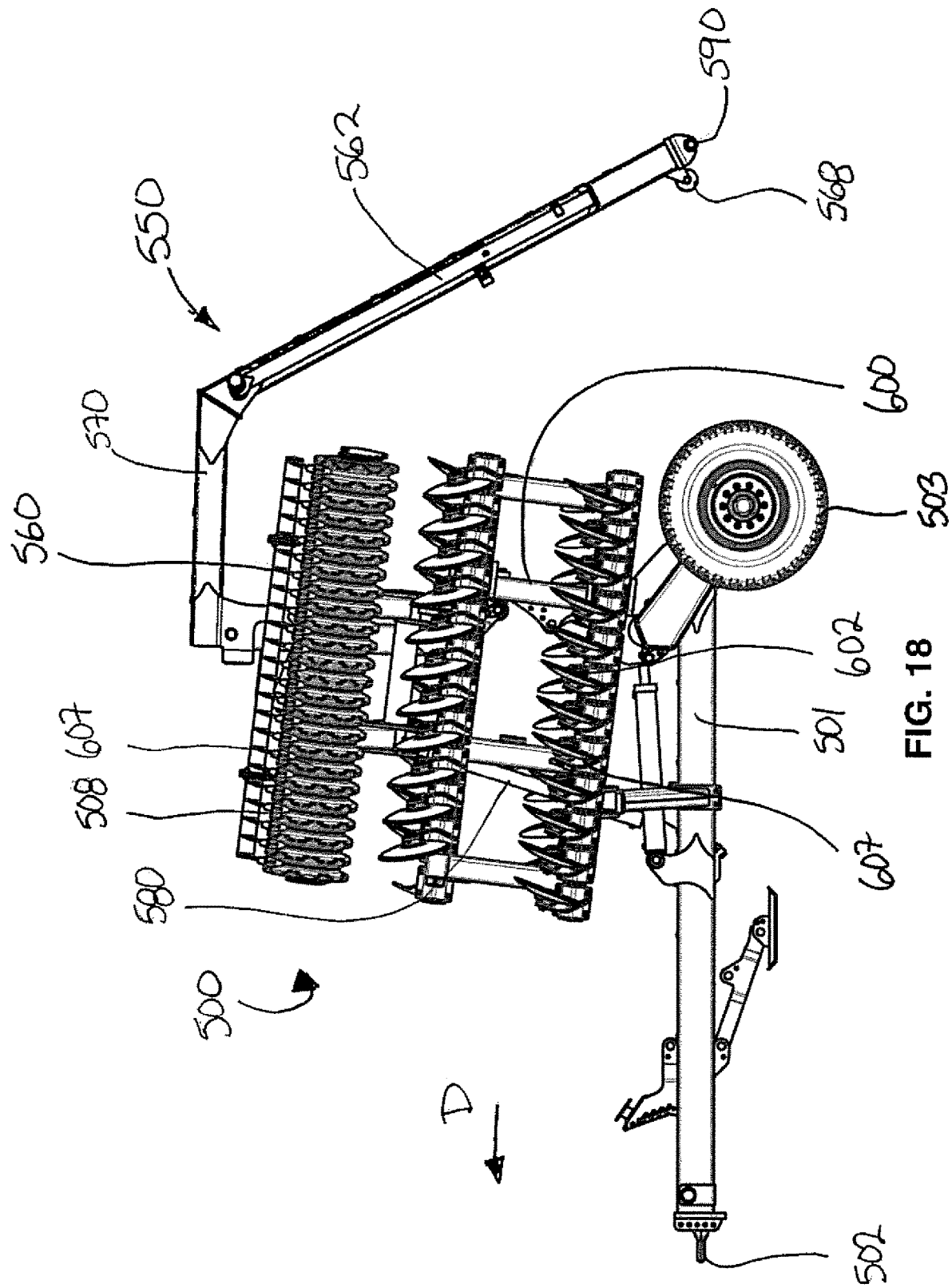
FIG. 18 is a side view of the first agricultural implement shown in FIG. 15 in a transport position.
Figure 19:
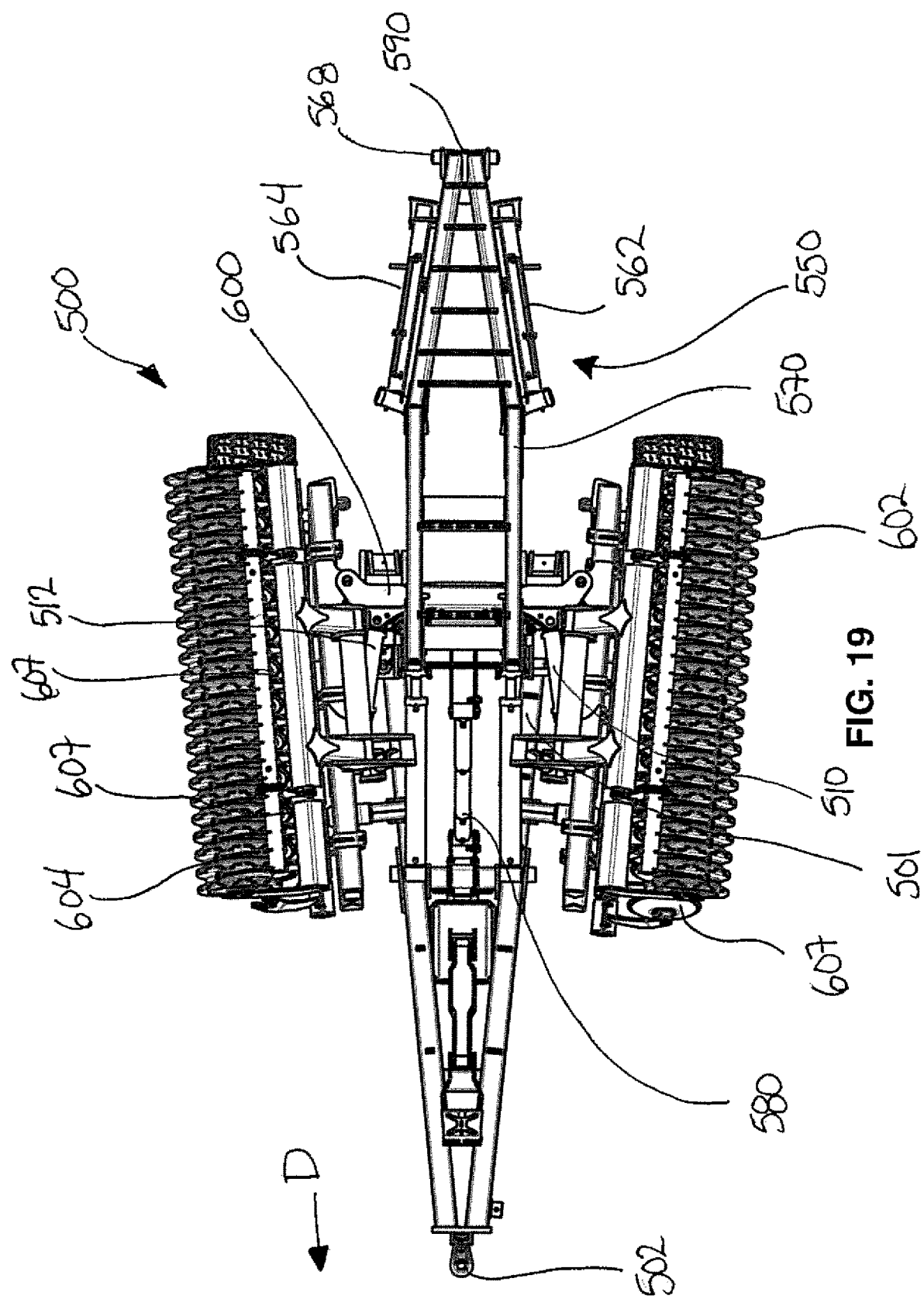
FIG. 19 is a top view of the first agricultural implement shown in FIG. 15 in a transport position.

When the entire work tool assembly 504 has been pivoted upwards, the first wing section 602 and the second wing section 604 carrying the work tools 607 can be pivoted relative to the center section 600 so that the first wing section 602 and the second wing section 604 are pivoted in towards the frame 501 as shown in FIGS. 18 and 19.

Figure 14:
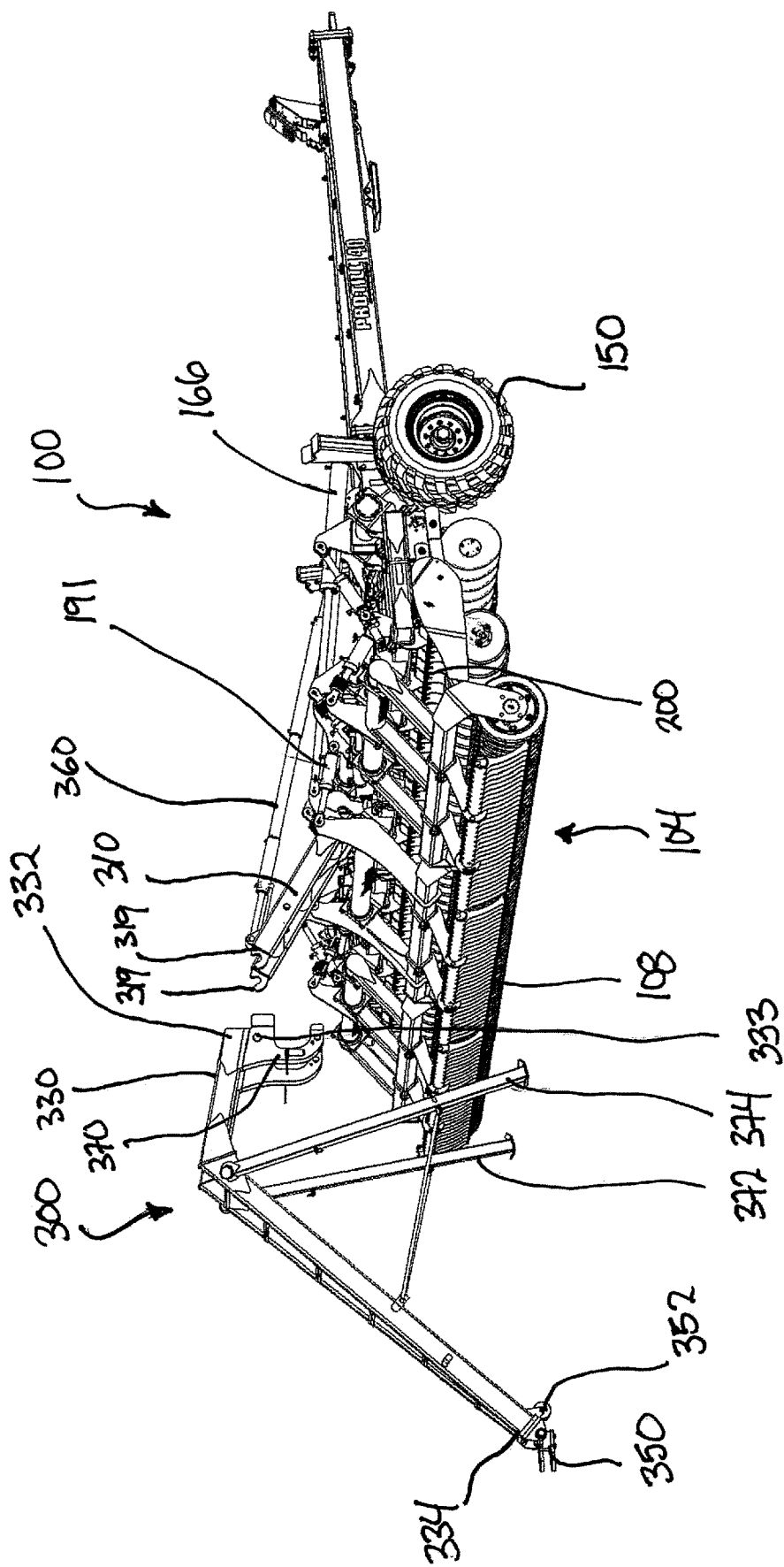
FIG. 14 is a perspective view with a portion of the rear tow hitch assembly removed from the cultivator.

Referring to FIG. 14, a portion of the rear tow hitch assembly 300 can be removed by a single person when it is desired to use the first implement 100 without the complete rear tow hitch assembly 300 being attached to the first implement 100, such as when the operator does not desire to tow a second implement behind the first implement 100. The arched frame 330 can be separated and removed from the main support frame 310. The arched frame 330 extends above and behind the work tool assembly 104 and adds extra weight. Removal of the arched frame 330 also can reduce the transport height of the first implement 100 making it easier to drive under bridges, park the first implement 100 indoors, etc. By removing the arched frame 330 from the main support frame 310, the remaining main support frame 310 will simply extend upwards from the work tool assembly 104 and will eliminate the weight of the arched frame 330.

To remove the arched frame 330 from the main support frame 310, retaining pins 321 securing the connecting members 370 to the sides of the main support frame 310 can be removed and the positioning actuator 360 can be used to rotate the main support frame 310 around the pivot point 311 towards a rear end of the first implement 100 until the second end 334 of the arched frame 330 is placed in contact with a ground surface. In one aspect, if a hitch wheel 352 is provided on second end 334 of the arched frame 330, the main support frame 310 can be rotated backwards until the hitch wheel 352 comes in contact with the ground surface. The positioning actuator 360 can continue to rotate the main support frame 310 backwards causing the second end 334 of the arched frame 330 to move backwards across the ground surface. The continued rotation of the main support frame 310 as the second end 334 of the arched frame 330 moves backwards along the ground surface will cause the arched frame 330 to pivot relative to the main support frame 310 since the connecting members 370 are no longer secured to the sides of the main support frame 310 and therefore are no longer preventing the main support frame 310 and the arched frame 330 from pivoting relative to one another. This pivoting will cause the pins 333 on the first end 332 of the arched frame 330 to rotate in the retaining sections 319 on the second end 314 of the main support frame 310 and the connecting members 370 extending from the first end 332 of the arched frame 330 to rotate away from the sides of the main support frame 310.

With the connecting members 370 moved away from the sides of the main support frame 310, the first and second support legs 372, 374 can be connected to the sides of the arched frame 330 to support the arched frame 330 in place. The positioning actuator 360 can continue to be extending to move the retaining section 319 on the main support frame 310 off of the pins 333 on the arched frame 330 until the retaining section 319 are free of the pins 333 and positioned below the pins 333.

In one aspect, the first and second support legs 372, 374 can be rotatably connected to the arched frame 330 allowing the first and second support legs 372, 374 to be swung downwards against the ground surface to support the arched frame 330 in place. In a further aspect, the first and second support legs 372, 374 can be telescopic or otherwise adjustable in length to better accommodate detaching the arched frame 330 on uneven ground surfaces.

With the retaining sections 319 on the main support frame 310 positioned below and clear of the pins 333 on the arched frame 330, the operator of the tow vehicle can then tow the first implement 100 forward slightly with the arched frame 330 remaining behind and supported by the first and second support legs 372, 374. This will separate the main support frame 310, which will remain connected to the work tool assembly 104 of the first implement 100, from the arched frame 330 which will be supported on its own by the support legs 372, 374. The operator can then tow the first implement 100 away from the supported arched frame 330 and use the first implement 100 with only the main support frame 310 and the positioning actuator 360 attached. The arched frame 330 with its generally curving or arched shape that extends behind the work tool assembly 104 is removed while the main support frame 310, which merely extends upwards from the work tool assembly 104 and therefore is much less likely to get in the way compared to the arched frame 330, remains connected to the first implement 100.

When an operator wants to reattach the arched frame 330 to the main support frame 310 to once again have the entire rear tow hitch assembly 300 provided on the first implement 100, he or she can use the positioning actuator 360 to rotate the main support frame 310 away from the front of the first implement 100 until the retaining sections 319 are positioned below the pins 333 on the self-supported arched frame 330, if they are not already positioned low enough. The operator can then back up the first implement 100 until the pins 333 on the first end 332 of the arched frame 330 are positioned relative to the retaining sections 319 on the second end 314 of the main support frame 310 so that the operator can then use the positioning actuator 360 to rotate the main support frame 310 towards the front of the first implement 100 causing the retaining sections 319 to rotate onto the pins 333 on the arched frame 330. Continuing to rotate the main support frame 310 around the pivot points 311 using the positioning actuator 360 will rotate the connecting members 370 towards the sides of the main support frame 310 so that the retaining pins 321 can be inserted back through the connecting members 370 so once again secure the connecting members 370 to the sides of the main support frame 310 thereby securing the arched frame 330 and the main support frame 310 fixedly together so that they will not rotate relative to one another. The support legs 372, 374 can then be removed from their position supporting the arched frame 330 and the arched frame 330 will then be connected once again to the main support frame 310.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A first agricultural implement comprising:
a frame having a front end and a rear end;
a tow assembly attached to the front end of the frame so the first agricultural implement can be towed by a tow vehicle in a direction of travel;
a work tool assembly having a front end and a rear end, the work tool assembly pivotally attached at the front end of the work tool assembly to the rear end of the frame so that the work tool assembly is pivotal around a first axis substantially perpendicular to the direction of the travel of the first agricultural implement;
a pair of ground wheels; and
a rear tow hitch assembly connected to the work tool assembly, the rear tow hitch assembly comprising:
a main support frame having a first end and a second end, the first end of the main support frame pivotally connected to the work tool assembly at a pivot point proximate the rear end of the work tool assembly;
an arched frame having a first end and a second end, the first end of the arched frame connected to the second end of the main support frame, the arched frame shaped to clear the work tool assembly; and a rear hitch provided at a second end of the arched frame, the rear hitch connectable to a second agricultural implement,
wherein the first agricultural implement is transformable between an operating position and a transport position by pivoting the work tool assembly upwards around the first axis,
and wherein the rear tow hitch assembly is shaped to clear the work tool assembly when the first agricultural implement is transformed between the operating position and the transport position while the rear tow hitch assembly remains connected to the second agricultural implement.

2. The first agricultural implement of claim 1 wherein the main support frame extends substantially vertically from the work tool assembly when the work tool assembly is in the operating position.

3. The first agricultural implement of claim 1 wherein the first end of the arched frame is removably connectable to the second end of the main support frame.

4. The first agricultural implement of claim 3 further comprising at least one retaining section provided at a second end of the main support frame to connect the second end of the main support frame to the first end of the arched frame.

5. The first agricultural implement of claim 4 wherein the at least one retaining section has a c-shaped profile with an opening in the at least one retaining section facing a front of the first agricultural implement.

6. The first agricultural implement of claim 5 further comprising at least one pin provided on the first end of the arched frame, the at least one pin configured to mate with the opening in the at least one retaining section on the main support frame.

7. The first agricultural implement of claim 3 wherein the arched frame is at an angle of greater than 90° to the main support frame when the arched frame is connected to the main support frame.

8. The first agricultural implement of claim 1 wherein the arched frame has a first section and a second section and the first section and second section are at an angle greater than 90° and less than 180°.

9. The first agricultural implement of claim 3 further comprising connection members extending at an angle from the arched frame, the connection members operative to connect the arched frame to the main support frame.

10. The first agricultural implement of claim 3 further comprising at least one support leg to support the arched frame when the arched frame is disconnected from the main frame support.

11. The first agricultural implement of claim 10 wherein the at least one support leg is provided on an outside of side members of the second section of the arched frame when not in use.

12. The first agricultural implement of claim 1 further comprising a hitch wheel provided at a second end of the arched frame and operative to support the rear hitch off of a ground surface and allow the second end of the arched frame to roll along the ground surface.

13. The first agricultural implement of claim 1 further comprising a positioning actuator connected between the frame and the main support frame, the positioning actuator operative to rotate the main support frame around the pivot point.

14. The first agricultural implement of claim 1 wherein work tools extend below the work tool assembly.

15. The first agricultural implement of claim 1 wherein the work tool assembly comprises at least one carriage frame and a plurality of discs operably connected to the at least one carriage frame, each disc in the plurality of discs positioned to extend below the at least one carriage frame and come into contact with a ground surface beneath the cultivating assembly, the plurality of discs having a first row of discs and a second row of discs, the second row of discs positioned behind the first row of discs.

16. The first agricultural implement of claim 15 wherein the carriage frame comprises a front beam and a rear beam and the first end of the main support frame is pivotally connected at the pivot point to the rear beam of the carriage frame.

17. The first agricultural implement of claim 15 further comprising a finishing tool operatively and adjustably connected to the carriage frame and positioned behind the plurality of discs so that the finishing tool passes over the ground surface the discs have passed over when the cultivator is towed in the direction of travel, wherein a height of the carriage relative to the finishing tool is adjustable.

18. The first agricultural implement of claim 1 wherein the cultivating assembly further comprises: a center section having a front end, a rear end, a first side and a second side, the center section pivotally connected at the front of the center section to the rear end of the frame so that the center sections is pivotal around a first axis substantially perpendicular to the direction of travel of the cultivator; a first wing section pivotally connected to the first side of the center section; and a second wing pivotally connected to the second side of the center section, wherein the first end of the main support frame is pivotally connected to the center section of the work tool assembly proximate the rear end of the work tool assembly.

19. The first agricultural implement of claim 18 wherein the first wing section is pivotal relative to the center section towards a position substantially perpendicular to the center section and wherein the second wing section is pivotal relative to the center section towards a position substantially perpendicular to the center section.

20. The first agricultural implement of claim 19 wherein the first wing section has a plurality of work tools provided below the first wing section and wherein the second wing section has a plurality of work tools provided below the second wing section.

21. The first agricultural implement of claim 20 wherein the first wing section and the second wing section partially extend below the center section when the first agricultural implement is in the operating position.

22. The first agricultural implement of claim 20 wherein the center section has a plurality of work tools provided below the center section and wherein the first wing section is pivotally connected at one side of the first wing section to the first side of the center section and wherein the second wing section is pivotally connected at one side of the second wing section to the second side of the center section.

23. The first agricultural implement of claim 19 wherein the first agricultural implement is transformable from an operating position to a transport position by pivoting the center section of the work tool assembly upwards relative to the rear end of the frame and pivoting the first wing section relative to the center section and pivoting the second wing section relative to the center section so that the center section is positioned near perpendicular to the frame and the first wing section and the second wing section are pivoted towards the frame.

24. The first agricultural implement of claim 14 wherein all of the wheels of the first agricultural implement are provided in front of the work tools on the first agricultural implement assembly when the first agricultural implement is used in the operating position.

25. A rear tow hitch assembly connectable to work tool assembly of a first agricultural implement to tow a second agricultural implement behind the first agricultural implement, the rear tow hitch assembly comprising:
 a main support frame having a first end and a second end, the first end of the main support frame pivotally connectable to the work tool assembly of the first agricultural implement at a pivot point proximate the rear end of the work tool assembly;
 an arched frame having a first end and a second end, the first end of the arched frame connected to the second end of the main support frame, the arched frame shaped to clear the work tool assembly; and
 a rear hitch provided at a second end of the arched frame and connectable to the second agricultural implement, wherein the rear tow hitch assembly is shaped to not contact the work tool assembly when the first agricultural element is transformed between an operating position and a transport position.

26. The rear tow hitch assembly of claim 25 wherein the first end of the arched frame is removably connectable to the second end of the main support frame.

27. The rear tow hitch assembly of claim 26 further comprising at least one retaining section provided at a second end of the main support frame to connect the second end of the main support frame to the first end of the arched frame.

28. The rear tow hitch assembly of claim 27 wherein the at least one retaining section has a c-shaped profile with an opening in the at least one retaining section facing a front of the first agricultural implement.

29. The rear tow hitch assembly of claim 28 further comprising at least one pin provided on the first end of the arched frame, the at least one pin configured to mate with the opening in the at least one retaining section on the main support frame.

30. The rear tow hitch assembly of claim 27 wherein the arched frame is at an angle of greater than 90° degree to the main support frame when the arched frame is connected to the main support frame.

31. The rear tow hitch assembly of claim 25 wherein the arched frame has a first section and a second section and the first section and second section are at an angle greater than 90° degree and less than 180°.

32. The rear tow hitch assembly of claim 27 further comprising connection members extending at an angle from the arched frame, the connection members operative to connect the arched frame to the main support frame.

33. The rear tow hitch assembly of claim 27 further comprising at least one support leg to support the arched frame when the arched frame is disconnected from the main frame support.

34. The rear tow hitch assembly of claim 33 wherein the at least one support leg is provided on an outside of side members of the second section of the arched frame when not in use.

35. The rear tow hitch assembly of claim 25 further comprising a hitch wheel provided at a second end of the arched frame and operative to support the rear hitch off of a ground surface and allow the second end of the arched frame to roll along the ground surface.

* * * * *